United States Patent
Hamai et al.

(10) Patent No.: US 11,643,069 B2
(45) Date of Patent: May 9, 2023

(54) VEHICLE AND PARKING ASSISTANCE APPARATUS

(71) Applicant: PANASONIC INTELLECTUAL PROPERTY MANAGEMENT CO., LTD., Osaka (JP)

(72) Inventors: Yuya Hamai, Kanagawa (JP); Akihiro Morimoto, Kanagawa (JP); Manabu Nakakita, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 398 days.

(21) Appl. No.: 16/912,328

(22) Filed: Jun. 25, 2020

(65) Prior Publication Data
US 2020/0406888 A1    Dec. 31, 2020

(30) Foreign Application Priority Data

Jun. 27, 2019 (JP) .............................. JP2019-120332
Jun. 27, 2019 (JP) .............................. JP2019-120333
(Continued)

(51) Int. Cl.
*B60W 30/06* (2006.01)
*B60W 10/06* (2006.01)
(Continued)

(52) U.S. Cl.
CPC ............ *B60W 30/06* (2013.01); *B60W 10/06* (2013.01); *B60W 10/20* (2013.01); *B62D 5/046* (2013.01);
(Continued)

(58) Field of Classification Search
CPC ...... B60W 30/06; B60W 10/06; B60W 10/20; B60W 2050/146; B60W 2420/42; B60W 2520/00; B62D 5/046; B62D 15/0285
See application file for complete search history.

(56) References Cited

U.S. PATENT DOCUMENTS 6,070,684 A    6/2000  Shimizu et al.
9,738,277 B2 *  8/2017  Ha ........................ G05D 1/0088
(Continued)

FOREIGN PATENT DOCUMENTS

DE    102016121632    5/2018
DE    102018220279    5/2019
(Continued)

OTHER PUBLICATIONS

Office Action from Japan Patent Office (JPO) in Japanese Patent Appl. No. 2019-120332, dated Nov. 1, 2022, together with an English language translation.

*Primary Examiner* — Frederick M Brushaber
(74) *Attorney, Agent, or Firm* — Greenblum & Bernstein, P.L.C.

(57) ABSTRACT

A vehicle is configured to assist parking at a predetermined position by generating a path to the predetermined position and changing, based on the path, at least a vehicle wheel angle of a steered wheel. The vehicle includes: at least one steered wheel; at least one driven wheel; a power unit configured to provide a driving force to the driven wheel; and an operation device configured to receive at least an operation of changing power of the power unit. Before the predetermined position on the path, the vehicle wheel angle of the steered wheel is changed based on the path. If the vehicle travels beyond the predetermined position of the path, the vehicle wheel angle of the steered wheel is changed
(Continued)

to allow the vehicle to advance in a tangential direction of the predetermined position of the path.

20 Claims, 14 Drawing Sheets

(30) Foreign Application Priority Data

Jun. 27, 2019 (JP) .............................. JP2019-120334
Jun. 27, 2019 (JP) .............................. JP2019-120335
Jun. 27, 2019 (JP) .............................. JP2019-120336

(51) Int. Cl.
*B60W 10/20* (2006.01)
*B62D 5/04* (2006.01)
*B60W 50/14* (2020.01)

(52) U.S. Cl.
CPC ... *B60W 2050/146* (2013.01); *B60W 2420/42* (2013.01)

(56) References Cited

U.S. PATENT DOCUMENTS

| | | | |
|---|---|---|---|
| 9,925,978 B2* | 3/2018 | Tseng | B60W 10/04 |
| 10,369,989 B2* | 8/2019 | Sharma | G05D 1/0212 |
| 2005/0104378 A1* | 5/2005 | Matsuda | B60K 6/52 |
| | | | 290/40 C |
| 2017/0043766 A1* | 2/2017 | Ha | B62D 15/0285 |
| 2017/0267233 A1* | 9/2017 | Minster | G06Q 10/02 |
| 2018/0009477 A1* | 1/2018 | Pla Rubio | B62D 15/0285 |
| 2018/0105166 A1* | 4/2018 | Sharma | B60W 30/06 |
| 2018/0308359 A1* | 10/2018 | Hayakawa | B62D 15/0285 |
| 2019/0162545 A1 | 5/2019 | Greenwood | |
| 2021/0229655 A1* | 7/2021 | Amadi | G06F 3/04817 |

FOREIGN PATENT DOCUMENTS

| | | | |
|---|---|---|---|
| EP | 3514031 B1 * | 11/2020 | B60R 11/02 |
| JP | 01-125700 | 5/1989 | |
| JP | 01-302500 | 12/1989 | |
| JP | 11-034890 | 2/1999 | |
| JP | 2004-352120 | 12/2004 | |
| JP | 2009-298384 | 12/2009 | |
| JP | 2016-084029 | 5/2016 | |
| JP | 2018-034540 | 3/2018 | |

* cited by examiner

VEHICLE AND PARKING ASSISTANCE APPARATUS

FIELD

The present disclosure relates to a vehicle and a parking assistance apparatus that enable parking assistance that guides an own vehicle to a target position by automatic steering.

BACKGROUND

In the related art, the above-described parking assistance apparatus has been developed. For example, a parking assistance method and a parking assistance apparatus disclosed in JP-A-2018-034540 set a target path for a vehicle to move from an initial position to a target parking position, and further set at least one of a target speed and a target steering angle for the vehicle to move along the set target path. Thereafter, an amount of deviation between a current position of the vehicle and a position of the target path is calculated, a correction amount of at least one of the target speed and the target steering angle is calculated so as to reduce the amount of deviation, and at least one of the target speed and the target steering angle is corrected based on the calculated correction amount.

Here, parking assistance operations when a driver operates an accelerator, a brake, and a shift during parking assistance and the parking assistance apparatus controls a vehicle wheel angle will be described. FIG. 14 is a diagram schematically showing a state when a vehicle 10 starts parking assistance and generates a path 200. The vehicle 10 shown in FIG. 14 includes four vehicle wheels, and each of the two front vehicle wheels is a steered wheel 11 and each of the two rear vehicle wheels is a driven wheel 12 when the vehicle 10 advances with the shift in a drive (D).

When the vehicle 10 starts parking assistance, the path 200 is first generated. A start point of the path 200 is P1s and is positioned at a center between the rear vehicle wheels of the vehicle 10. Further, an end point of the path 200 is P1f. After generating the path 200, the vehicle 10 changes a vehicle wheel angle of the steered wheels 11 based on the generated path 200 when the driver operates the accelerator, the brake, or the shift, and advances to the end point P1f. The advancing in this case is traveling forward (arrow Y1 direction). The vehicle 10 sequentially calculates a vehicle wheel angle for traveling on the path 200. That is, a vehicle wheel angle is calculated from a curvature of the path 200 and a vehicle wheel angle for correcting deviation of the vehicle 10 from the path 200 is calculated. The curvature is a reciprocal of a rotation radius.

When advancing to the end point P1f of the path 200, the vehicle 10 generates a next path. FIG. 15 is a diagram schematically showing a state when the vehicle 10 generates a next path 201. The vehicle 10 changes the vehicle wheel angle of the steered wheels 11 based on the generated path 201 and advances from a start point P2s to an end point P2f of the new path 201. The advancing in this case is traveling backward (arrow Y2 direction).

The vehicle 10 does not generate a path for a parking position serving as a target (for example, the end point P2f) at one time, but generates paths one by one and advances along the generated paths. That is, first, the vehicle 10 generates the forward first path 200 and advances thereon. When advancing on the path 200 is completed, the vehicle 10 generates the backward second path 201 and advances thereon. Generation of a path is not limited. For example, the first path and the second path may be forward, and a third path and a fourth path may be backward.

A vehicle traveling assistance apparatus that can perform guidance by setting an appropriate path in accordance with a relationship between a target position and a position of a vehicle has also been developed (for example, JP-A-2004-352120). The vehicle traveling assistance apparatus disclosed in JP-A-2004-352120, by being capable of selecting a path among paths having different turning states at a target position, for example, in a case of perpendicular parking, when an interval between a front vehicle and a rear vehicle is short and a path on which steering angle is returned to a neutral state cannot be selected, a path on which the steering angle is not returned is selected, so that guidance to the target position is enabled.

SUMMARY

However, during parking assistance, in a case where a path to a target position for turning or parking is generated, when the driver operates the accelerator, the brake, and the shift, if the vehicle travels beyond an end point of the path, the vehicle may be guided to a place where a next path cannot be generated. That is, since a steering amount is calculated from curvature information of the path and an amount of deviation from the path, a calculation result of the steering amount becomes unstable after the end point of the path is passed, and a possibility of failing to generate a next path increases.

Further, during parking assistance, although the path to the target position for turning or parking is generated, when a path generation timing is a timing at which the vehicle reaches the end point of the path, in a system that requires the driver to operate the accelerator, the brake, and the shift, it is assumed that the vehicle starts moving during the path calculation. Normally, the steering amount is calculated from the curvature information of the path and the amount of deviation from the path. Therefore, the steering amount cannot be calculated during the path calculation, and the vehicle may move to a place where guidance is difficult after the path is generated.

Further, during parking assistance, although the path to the target position for turning or parking is generated, in a system that requires the driver to operate the shift, it is considered that the vehicle may move in a direction opposite to an assumed advancing direction of the path due to carelessness or the like of the driver. For example, when the vehicle travels forward on a path on which traveling backward is assumed, it is considered that steering becomes unstable because the vehicle travels in reverse on the path. Even when the driver switches to a correct shift after the reverse traveling, it may be difficult for the vehicle to advance to an end point of the path as it is, and parking assistance may not be completed.

Further, in an automatic steering system, since a load on an electric power steering due to stationary steering (an operation of turning a steering wheel when the vehicle is in a substantially stopped state) increases, a steering angle (a vehicle wheel angle) at which the stationary steering is allowed may be set to reduce the load. When such a setting is performed, since the stationary steering is prohibited in a state of exceeding the steering angle at which the stationary steering is allowed, it is necessary to generate a path for performing steering (steering is returned so as to move) while traveling. Since paths for performing steering while traveling are generated for traveling forward and traveling backward one by one, when the vehicle stops at target positions on the paths, a next path is generated based on information (position, steering angle, and the like) of the vehicle at that time. However, since a path for performing steering while traveling is longer than a path for performing the stationary steering, path generation may become impossible and a system may be interrupted. For example, when the vehicle is stopped in a state of exceeding a steering angle at which stationary steering is allowed at the time of turning within a parallel parking target frame, and then generation of the next path is started, path generation becomes impossible due to a problem of a path length. Therefore, it is important to control the steering angle within a stationary steering range during path generation.

Further, when the vehicle departs from the path due to disturbance or the like, since steering angle correction for returning to the path works, even when the vehicle travels on a path calculated to form a vehicle wheel angle at an end point within the vehicle wheel angle at which the stationary steering is allowed, the vehicle wheel angle at the end point of the path falls into a state of exceeding the vehicle wheel angle at which the stationary steering is allowed, a path to be generated next becomes long. Therefore, generation of the next path may fail.

An object of the present disclosure is to provide a vehicle and a parking assistance apparatus by which, during parking assistance, when a path to a target position for turning or parking is generated, for example, in parking assistance where a driver operates an accelerator, a brake, and a shift, a steering amount can be calculated even when the vehicle travels beyond an end point of the path, and the vehicle can be guided to a place where a next path can be generated.

An object of the present disclosure is to provide a vehicle and a parking assistance apparatus by which, during parking assistance, when a timing at which a path to a target position for turning or parking is generated is a timing at which the vehicle reaches an end point of the path, for example, in parking assistance where a driver operates an accelerator, a brake, and a shift, the vehicle can be guided to a final target position even when the vehicle moves during generation of a next path.

An object of the present disclosure is to provide a vehicle and a parking assistance apparatus by which, during parking assistance, when a path to a target position for turning or parking is generated, for example, in parking assistance where a driver operates an accelerator, a brake, and a shift, the vehicle can be guided to a final target position even when the vehicle travels in reverse on the path due to a shift operation error of the driver.

An object of the present disclosure is to provide a vehicle and a parking assistance apparatus that can control a vehicle wheel angle at which stationary steering is allowed when an end point of a path is reached to be small, and can reduce a load on an electric power steering.

The present disclosure provides a vehicle configured to assist parking at a predetermined position by generating a path to the predetermined position and changing, based on the path, at least a vehicle wheel angle of a steered wheel, the vehicle including: at least one steered wheel; at least one driven wheel; a power unit configured to provide a driving force to the driven wheel; and an operation device configured to receive at least an operation of changing power of the power unit, in which before the predetermined position on the path, the vehicle wheel angle of the steered wheel is changed based on the path, and if the vehicle travels beyond the predetermined position of the path, the vehicle wheel angle of the steered wheel is changed to allow the vehicle to advance in a tangential direction of the predetermined position of the path.

The present disclosure provides a parking assistance apparatus mountable on a vehicle that includes: at least one steered wheel, at least one driven wheel, a power unit configured to provide a driving force to the driven wheel, and an operation device configured to receive at least an operation of changing power of the power unit, in which a path to a predetermined position is generated, and at least a vehicle wheel angle of the steered wheel is changed based on the path to assist parking of the vehicle at the predetermined position, and in which before the predetermined position on the path, the vehicle wheel angle of the steered wheel is changed based on the path, and in which if the vehicle travels beyond the predetermined position of the path, the vehicle wheel angle of the steered wheel is changed to allow the vehicle to advance in a tangential direction of the predetermined position of the path.

The present disclosure provides a vehicle configured to assist parking at a predetermined position by generating a path to the predetermined position and changing, based on the path, at least a vehicle wheel angle of a steered wheel, the vehicle including: at least one steered wheel; at least one driven wheel; a power unit configured to provide a driving force to the driven wheel; and an operation device configured to receive at least an operation of changing power of the power unit, in which before the predetermined position on the path, the vehicle wheel angle of the steered wheel is changed based on the path, and if the vehicle travels beyond the predetermined position of the path, the vehicle travels with the vehicle wheel angle of the steered wheel being set to a vehicle wheel angle within a predetermined range with reference to vehicle wheel angle at the predetermined position.

The present disclosure provides a parking assistance apparatus mountable on a vehicle that includes: at least one steered wheel, at least one driven wheel, a power unit configured to provide a driving force to the driven wheel, and an operation device configured to receive at least an operation of changing power of the power unit, in which a path to a predetermined position is generated, and at least a vehicle wheel angle of the steered wheel is changed based on the path to assist the vehicle at the predetermined position, in which before the predetermined position on the path, the vehicle wheel angle of the steered wheel is changed based on the path, and in which if the vehicle travels beyond the predetermined position of the path, the vehicle travels with the vehicle wheel angle of the steered wheel being set to a vehicle wheel angle within a predetermined range with reference to a vehicle wheel angle at the predetermined position.

The present disclosure provides a vehicle configured to assist parking at a predetermined position by a processor generating, at a first position, a path to a second position and changing, based on the path, at least a vehicle wheel angle of a steered wheel, the vehicle including: at least one steered wheel; at least one driven wheel; a power unit configured to provide a driving force to the driven wheel; an operation device configured to receive at least an operation of changing power of the power unit; and the processor, in which at least when the processor is generating the path at the first position, the vehicle travels with the vehicle wheel angle of the steered wheel being set to a vehicle wheel angle within a predetermined range with reference to a vehicle wheel angle at the first position.

The present disclosure provides a parking assistance apparatus mountable on a vehicle and configured to assist parking at a predetermined position by a processor generating, at a first position, a path to a second position and changing, based on the path, at least a vehicle wheel angle of a steered wheel, the vehicle including at least one steered wheel, at least one driven wheel, a power unit configured to provide a driving force to the driven wheel, an operation device configured to receive at least an operation of changing power of the power unit, and the processor, in which at least when the processor is generating the path at the first position, the vehicle wheel angle of the steered wheel are set to a vehicle wheel angle within a predetermined range with reference to a vehicle wheel angle at the first position.

The present disclosure provides a vehicle configured to assist parking at a predetermined position by generating a path having an advancing direction and changing, based on the path, at least a vehicle wheel angle of a steered wheel, the vehicle including: at least one steered wheel; at least one driven wheel; a power unit configured to provide a driving force to the driven wheel; an operation device configured to receive at least an instruction related to a forward advancing direction or a backward advancing direction, in which if the advancing direction of the path coincides with the advancing direction received by the operation device, at least the vehicle wheel angle of the steered wheel is changed based on the path, and is the advancing direction of the path does not coincide with the advancing direction received by the operation device, the vehicle wheel angle of the steered wheel is set to a value within a predetermined range.

The present disclosure provides a parking assistance apparatus mountable on a vehicle that includes at least one steered wheel, at least one driven wheel, a power unit configured to provide a driving force to the driven wheel, and an operation device configured to receive at least an instruction related to a forward advancing direction or a backward advancing direction, in which a path having an advancing direction is generated and at least a vehicle wheel angle of the steered wheel is changed based on the path to assist parking at a predetermined position, and if the advancing direction of the path coincides with the advancing direction received by the operation device, at least the vehicle wheel angle of the steered wheel is changed based on the path, and if the advancing direction of the path does not coincide with the advancing direction received by the operation device, the vehicle wheel angle of the steered wheel is set to a value within a predetermined range.

The present disclosure provides a vehicle configured to assist parking at a predetermined position by generating a path to the predetermined position and changing, based on the path, at least a vehicle wheel angle of a steered wheel, the vehicle including: at least one steered wheel; at least one driven wheel; and a power unit configured to provide a driving force to the driven wheel, in which the path includes at least a forward path on which the vehicle travels forward to a stop position and a backward path on which the vehicle travels backward from the stop position, and in which on the forward path, if the vehicle is positioned at a point where a distance from the stop position is larger than a first distance, the vehicle wheel angle is set to a value larger than a first angle that is a positive value with respect to a straight-traveling direction, and if the vehicle is positioned at a point where the distance from the stop position is smaller than the first distance, the vehicle wheel angle is set to the first angle with respect to the straight-traveling direction, and in which at the stop position, the vehicle wheel angle is changed, with respect to the straight-traveling direction, from the first angle to a second angle that is a negative value, and in which on the backward path, if the vehicle is positioned at a point where the distance from the stop position is smaller than a second distance, the vehicle wheel angle is set to the second angle with respect to the straight-traveling direction, and if the vehicle is positioned at a point where the distance from the stop position is larger than the second distance, the vehicle wheel angle is set to a value smaller than the second angle with respect to the straight-traveling direction.

The present disclosure provides a parking assistance apparatus mountable on a vehicle that includes at least one steered wheel, at least one driven wheel, and a power unit configured to provide a driving force to the driven wheel, in which a path to a predetermined position is generated and at least a vehicle wheel angle of the steered wheel is changed based on the path, so that parking at the predetermined position is assisted, and in which the path includes at least a forward path on which the vehicle travels forward to a stop position and a backward path on which the vehicle travels backward from the stop position, and in which on the forward path, if the vehicle is positioned at a distance from the stop position is larger than a first distance, the vehicle wheel angle is set to a value larger than a first angle that is a positive value with respect to a straight-traveling direction, and if the vehicle is positioned at a point where the distance from the stop position is smaller than the first distance, the vehicle wheel angle is set to the first angle with respect to the straight-traveling direction, and in which at the stop position, the vehicle wheel angle is changed, with respect to the straight-traveling direction, from the first angle to a second angle that is a negative value, and in which on the backward path, if the vehicle is positioned at a point where the distance from the stop position is smaller than a second distance, the vehicle wheel angle is set to the second angle with respect to the straight-traveling direction, and if the vehicle is positioned at a point where the distance from the stop position is larger than the second distance, the vehicle wheel angle is set to a value smaller than the second angle with respect to the straight-traveling direction.

According to the present disclosure, during parking assistance, when a path to a target position for turning or parking is calculated, for example, in parking assistance where a driver operates an accelerator, a brake, and a shift, a steering amount can be calculated even when a vehicle travels beyond an end point of the path, and the vehicle can be guided to a place where a next path can be generated.

According to the present disclosure, during parking assistance, when a timing at which a path to a target position for turning or parking is generated is a timing at which a vehicle reaches an end point of the path, for example, in parking assistance where a driver operates an accelerator, a brake, and a shift, the vehicle can be guided to a final target position even when the vehicle moves during generation of a next path.

According to the present disclosure, during parking assistance, when a path to a target position for turning or parking is generated, for example, in parking assistance where a driver operates an accelerator, a brake, and a shift, the vehicle can be guided to a final target position even when the vehicle travels in reverse on the path due to a shift operation error of the driver.

According to the present disclosure, the vehicle wheel angle at which stationary steering is allowed when an end point of a path is reached can be controlled to be small, and a load on an electric power steering can be reduced.

DETAILED DESCRIPTION

Hereinafter, embodiments that specifically disclose a vehicle and a parking assistance apparatus according to the present disclosure will be described in detail with reference to the drawings as appropriate. However, unnecessarily detailed descriptions may be omitted. For example, a detailed description of a well-known matter or a repeated description of substantially the same configuration may be omitted. This is to avoid unnecessary redundancy in the following description and to facilitate understanding by those skilled in the art. It should be noted that the accompanying drawings and the following description are provided for a thorough understanding of the present disclosure by those skilled in the art, and are not intended to limit the subject matter recited in the claims.

Hereinafter, preferred embodiments for carrying out the present disclosure will be described in detail with reference to the drawings.

First Embodiment

Figure 1:
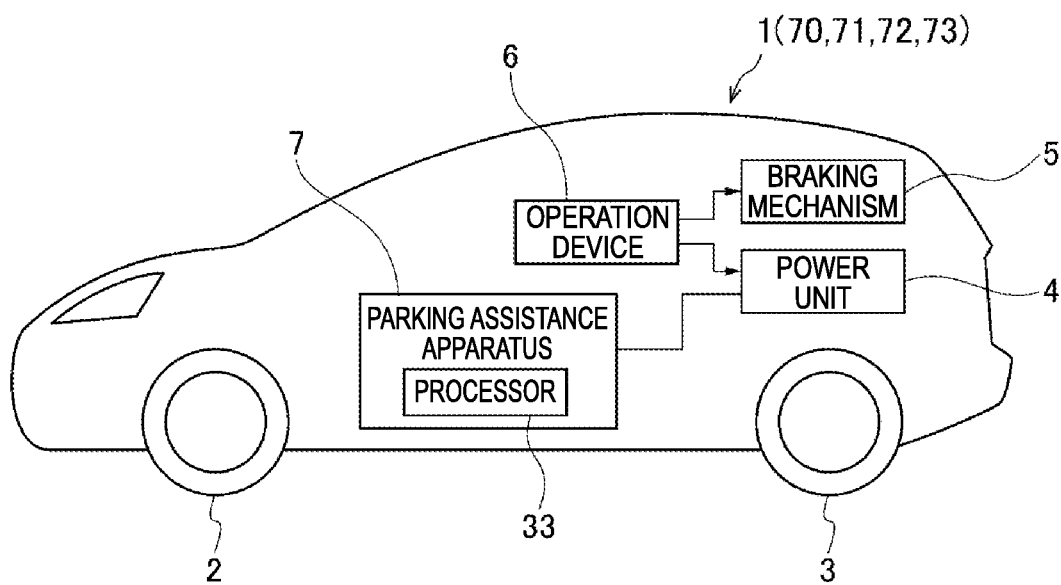
FIG. 1 is a diagram showing an external appearance of a vehicle of a first embodiment and a power unit, a braking mechanism, an operation device, and a parking assistance apparatus that are mounted on the vehicle.

Hereinafter, a vehicle according to a first embodiment will be described with reference to FIGS. 1 to 6. FIG. 1 is a diagram showing an external appearance of a vehicle 1 of the first embodiment and a power unit 4, a braking mechanism 5, an operation device 6, and a parking assistance apparatus 7 that are mounted on the vehicle 1. In FIG. 1, the vehicle 1 of the first embodiment includes four vehicle wheels, and each of the two front vehicle wheels is a steered wheel 2 and each of the two rear vehicle wheels is a driven wheel 3 when the vehicle 1 advances with a shift in a drive (D). In this case, since FIG. 1 is a diagram showing a side surface of the vehicle 1, only the two front and rear vehicle wheels 2 and 3 are seen, but in reality, a steered wheel 2 is provided on a front opposite side, and a driven wheel 3 is provided on a rear side. In the vehicle 1 of the first embodiment, the two front vehicle wheels are set as the steered wheels 2 and the two rear vehicle wheels are set as the driven wheels 3. However, the steered wheels 2 may serve as the driven wheels (driving method referred to as so-called front-engine front-drive (FF)).

The power unit 4 includes an internal combustion engine (for example, a gasoline engine), or an electric motor, or both the internal combustion engine and the electric motor, and provides a driving force to the two driven wheels 3. The braking mechanism 5 provides a braking force to the steered wheels 2 and the driven wheels 3. The braking mechanism 5 is provided on the steered wheels 2 and the driven wheels 3, but may be provided only on the front steered wheels 2 or only on the rear driven wheels 3. The operation device 6 receives an operation of changing power of the power unit 4 (so-called accelerator operation). Further, the operation device 6 also receives an operation of changing a braking force of the braking mechanism 5 (so-called brake operation). The operation device 6 includes an accelerator operation related component (not shown) including an accelerator pedal and a brake operation related component (not shown) including a brake pedal.

Figure 3:
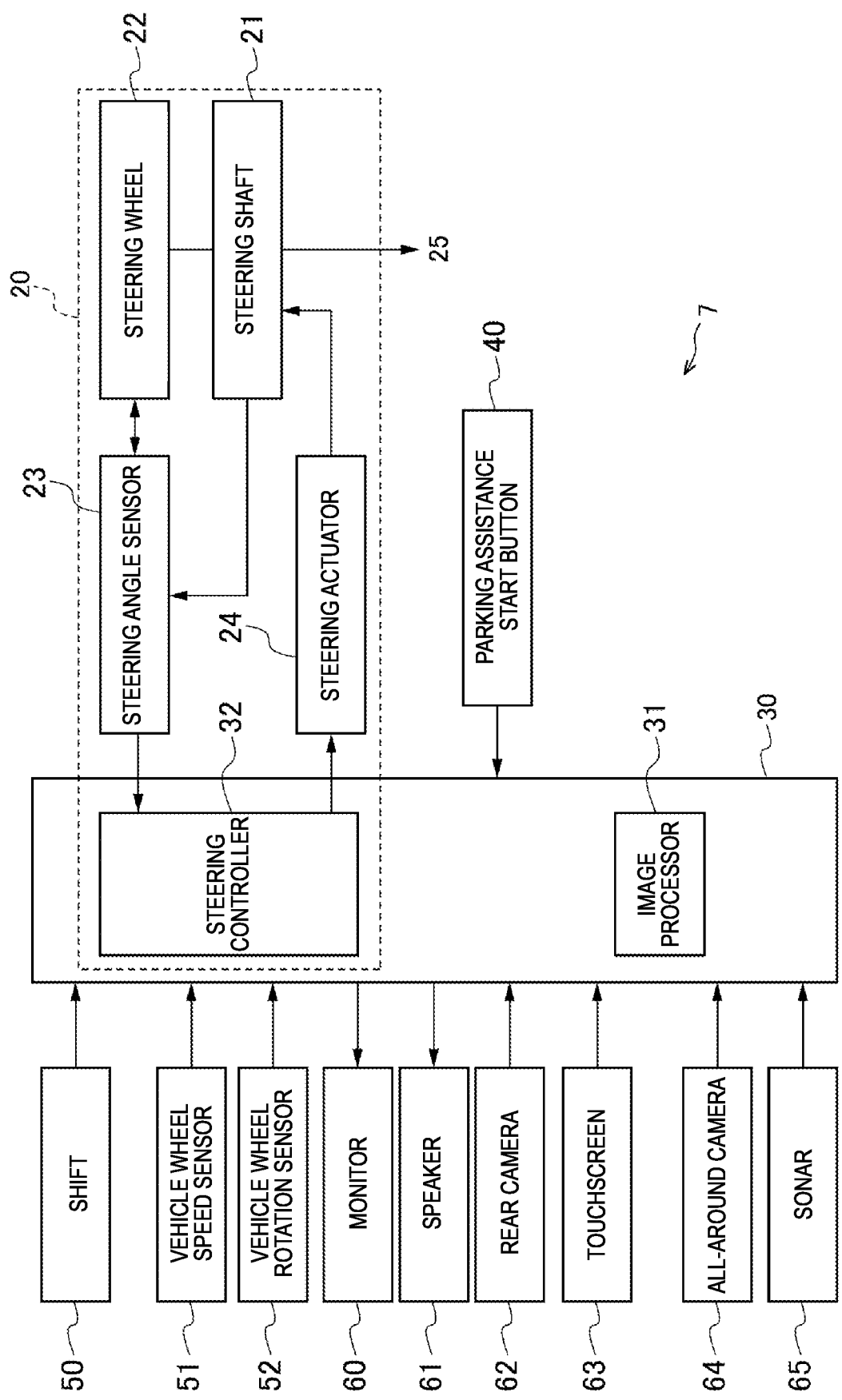
FIG. 3 is a block diagram showing a schematic configuration of the parking assistance apparatus mounted on the vehicle of the first embodiment.

The parking assistance apparatus 7 controls the power unit 4 during parking assistance so as to perform parking assistance of the vehicle 1. FIG. 3 is a block diagram showing a schematic configuration of the parking assistance apparatus 7 mounted on the vehicle 1 of the first embodiment. In FIG. 3, the parking assistance apparatus 7 includes an automatic steering device 20, a parking assistance electronic control unit (ECU) 30, a parking assistance start button 40, a shift 50, vehicle wheel speed sensors 51, a vehicle wheel rotation sensor 52, a monitor 60, a speaker 61, a rear camera 62, a touchscreen (input circuit) 63, an all-around camera 64, and sonars 65.

Figure 2:
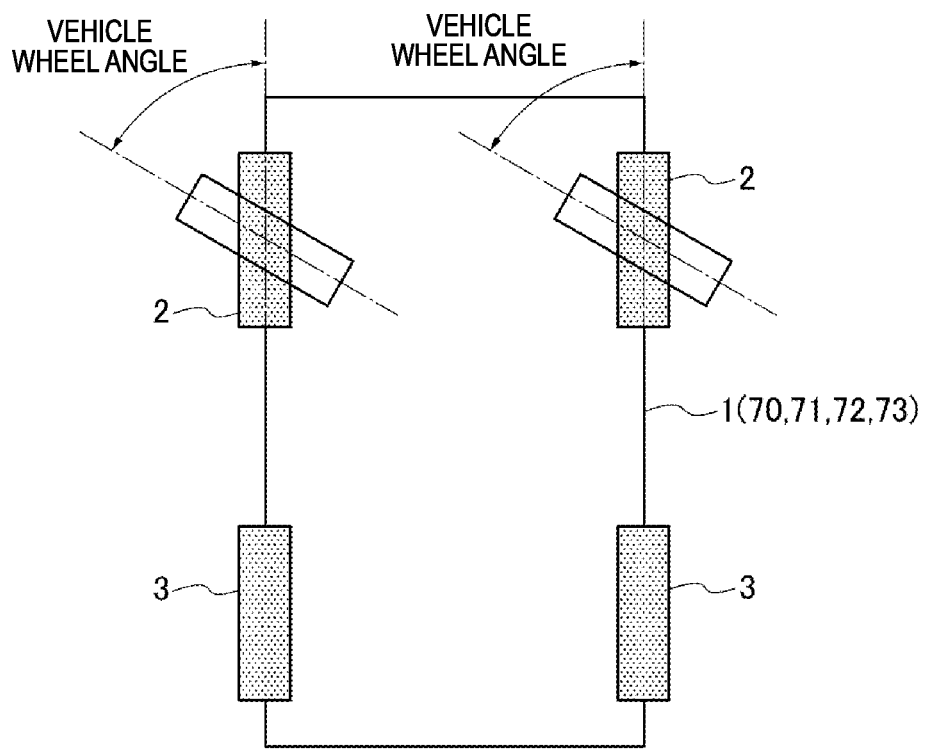
FIG. 2 is a diagram for illustrating a vehicle wheel angle of steered wheels of the vehicle of the first embodiment.

The automatic steering device 20 includes a steering shaft 21, a steering wheel 22, a steering angle sensor 23, and a steering actuator 24, and is controlled by the parking assistance ECU 30. The steering shaft 21 transmits movement of the steering wheel 22 to a turning wheel 25. The steering angle sensor 23 detects a steering amount of the steering shaft 21. The steering actuator 24 applies a steering force to the steering shaft 21. The steering angle sensor 23 and the steering actuator 24 are connected to the steering shaft 21. The steering actuator 24 also serves as an electric power steering (EPS) that applies a steering force so as to change vehicle wheel angles of the steered wheels 2 during automatic steering and that applies an assist steering force so as to change the vehicle wheel angles of the steered wheels 2 when a driver steers. The vehicle wheel angles mean angles of vehicle wheels with respect to a direction of the vehicle wheels when the vehicle 1 travels straight, and are also generally referred to as tire angles. FIG. 2 shows angles of the steered wheels 2.

The shift 50, the vehicle wheel speed sensors 51, the vehicle wheel rotation sensor 52, the monitor (display circuit) 60, the speaker 61, the rear camera 62, the touchscreen 63, the all-around camera 64, and the sonars 65 are connected to the parking assistance ECU 30. The shift 50 functions as an operation device and receives a switching operation of a drive (D), neutral (N), rear (R), and parking (P). The vehicle wheel speed sensors 51 are arranged on the steered wheels 2 and the driven wheels 3 so as to detect a vehicle wheel speed. The vehicle wheel rotation sensor 52 detects rotation of at least one of the four vehicle wheels including the steered wheels 2 and the driven wheels 3. The monitor 60 displays images captured by the rear camera 62 and the all-around camera 64. As the monitor 60, a liquid crystal display, an organic electro luminescence (EL) display, or the like is used.

The speaker 61 converts a sound signal output from the parking assistance ECU 30 into sound. The sound signal output from the parking assistance ECU 30 indicates an operation state of the parking assistance ECU 30. The rear camera 62 is mounted on a rear portion of the vehicle 1 and captures a rear image of the vehicle 1. The touchscreen 63 is formed to have substantially the same size as that of a screen of the monitor 60, and is disposed so as to overlap the screen of the monitor 60. The touchscreen 63 receives various inputs during a parking assistance operation. For example, an input for a predetermined position of a path to be generated is received.

The all-around camera 64 is referred to as a so-called fisheye camera and captures images around the vehicle 1. A sonar 65 transmits a sound wave and receives the sound wave reflected and returned from an obstacle, so that an obstacle around the vehicle 1 is probed. The sonars 65 are arranged at both corner parts on a front portion and both corner parts on the rear portion of the vehicle 1.

As shown in FIG. 3, the parking assistance ECU 30 includes an image processor 31 and a steering controller 32. During parking assistance, the image processor 31 acquires an image captured by the all-around camera 64 and an image captured by the rear camera 62, and performs an image processing for parking assistance. In the image processing for parking assistance, the image processor 31 performs an image processing on an image (first image) captured by the all-around camera 64 and converts the image into an around view (second image). Then, the around view is displayed on the monitor 60. Further, the image processor 31 causes a predetermined position when a path to the predetermined position is generated to be displayed so as to overlap the around view. The monitor 60 displays the around view, and displays the predetermined position of the path so as to overlap the around view. Here, the parking assistance ECU 30 generates the path to the "predetermined position", and the predetermined position is a "target position". Particularly, when generating two paths to a parking position, a target position of the second path is set as a final target position.

In addition to using the fisheye camera as the all-around camera 64, a plurality of wide-angle and high-resolution cameras can be mounted on the vehicle 1 and images from these cameras can be combined, so that the combined images can also be converted into the around view. The steering controller 32 acquires an output signal of the steering angle sensor 23, output signals of the vehicle wheel speed sensors 51, and an output signal of the vehicle wheel rotation sensor 52 during parking assistance, and controls driving of the steering actuator 24 based on these output signals.

The parking assistance ECU 30 implements a function of the image processor 31 and a function of the steering controller 32 by a processor 33 (see FIG. 1). It should be noted that two processors 33 may be provided. The function of the image processor 31 may be implemented by one processor 33, and the function of the steering controller 32 may be implemented by another processor 33. Further, the processor 33 may perform an image processing and steering control not by software but by hardware in the parking assistance ECU 30. Since main control of the parking assistance apparatus 7 is performed by the processor 33 that constitutes the parking assistance ECU 30, the processor 33 is set as a subject in the following description of an operation.

The processor 33 detects pressing of the parking assistance start button 40, so that a parking assistance processing is performed using a switching operation state of the shift 50, the output signals of the vehicle wheel speed sensors 51, the output signal of the vehicle wheel rotation sensor 52, a rear image captured by the rear camera 62, an all-around image captured by the all-around camera 64, and output signals of the sonars 65. That is, the processor 33 generates a path to a target position and changes the vehicle wheel angles of the steered wheels 2 based on the generated path, so that parking at the target position is assisted. The processor 33 calculates a steering amount for changing the vehicle wheel angles of the steered wheels 2 from curvature information of the path and an amount of deviation from the path.

The processor 33 generates a path after the vehicle 1 mainly stops in the vicinity of an end point of a path. That is, the processor 33 generates a first path, and then generates a next path after the vehicle 1 stops in the vicinity of an end point of the first path.

The processor 33 changes the vehicle wheel angles of the steered wheels 2 based on a path before an end point of the path. When the vehicle 1 travels beyond a target position of the path, the processor 33 changes the vehicle wheel angles of the steered wheels 2 so as to advance in a tangential direction of the target position of the path. That is, in a case where the steering amount is calculated from the curvature information of the path and the amount of deviation from the path, when the vehicle 1 travels beyond the target position, the steering amount cannot be calculated, and the vehicle 1 may be guided to a place where the next path cannot be generated. Therefore, when the vehicle 1 travels beyond the target position of the path, the processor 33 calculates a steering amount for traveling on a tangent to the target position of the path. Accordingly, simply by the vehicle 1 traveling straight (forward/backward) at the beginning, the next path is successfully generated via the end point of the original path.

Figure 4:
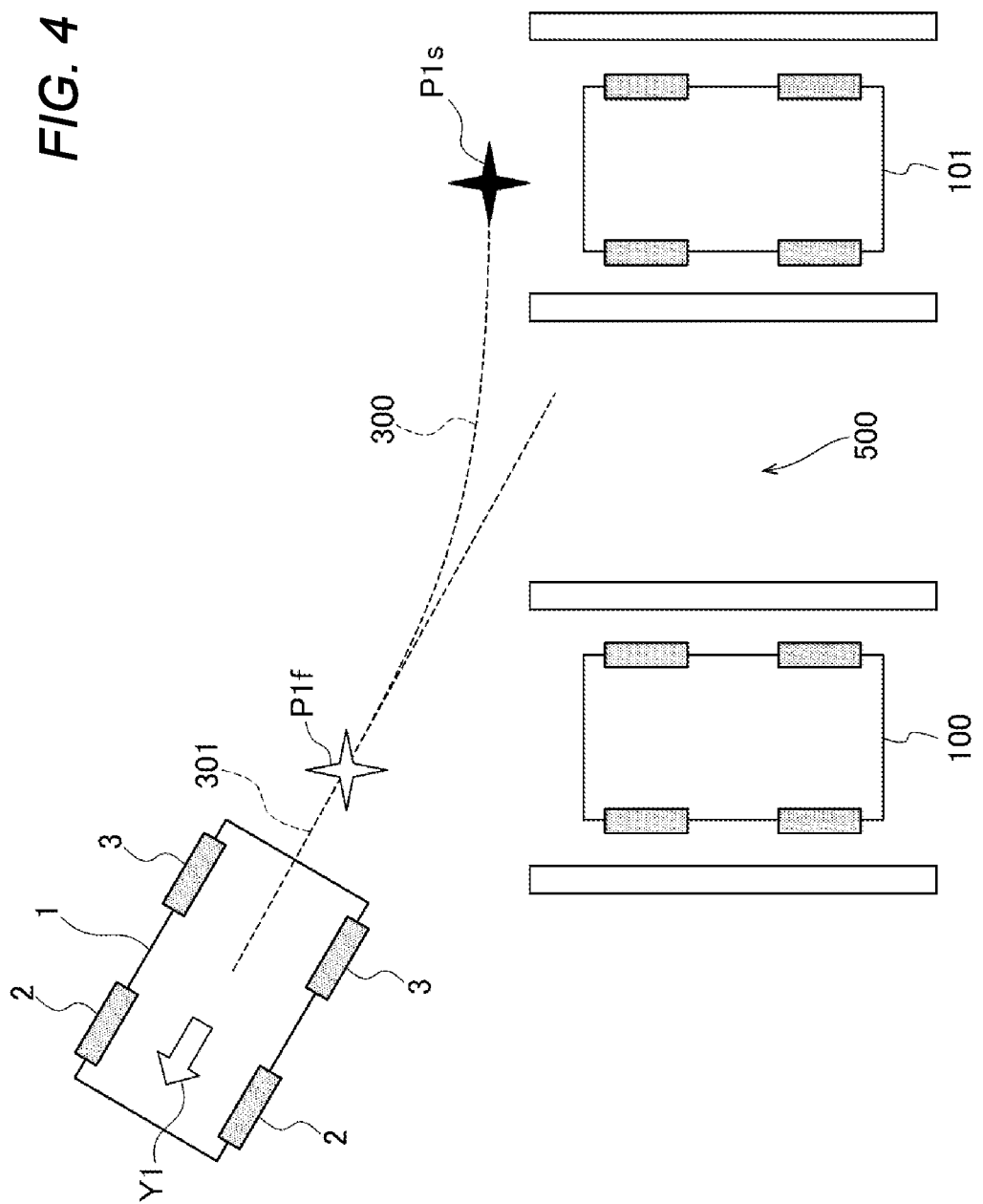
FIG. 4 is a diagram schematically showing a state when the parking assistance apparatus mounted on the vehicle of the first embodiment generates a first path.

This control, that is, control when a target position is exceeded, is as follows. FIG. 4 is a diagram schematically showing a state when the vehicle 1 starts parking assistance and generates a first path 300. In FIG. 4, when the vehicle 1 starts parking toward an empty space 500 between a vehicle 100 and a vehicle 101, the processor 33 first generates the path 300. In this case, a start point of the path 300 is P1s and an end point is P1f. The "end point P1f" is a "target position" of the path 300. When the driver operates an accelerator, a brake, or a shift after the path 300 is generated, the processor 33 changes the vehicle wheel angles of the steered wheels 2 so as to guide the vehicle 1 to the end point P1f of the path 300 based on the generated path 300. A guiding direction in this case is a forward direction (a direction indicated by an arrow Y1 is a forward direction). The processor 33 sequentially calculates vehicle wheel angles for traveling on the path 300. That is, the processor 33 calculates a vehicle wheel angle from a curvature of the path 300 and also calculates a vehicle wheel angle for correcting a deviation of the vehicle 1 from the path 300. The curvature is a reciprocal of a rotation radius.

When guiding the vehicle 1 to the end point P1f of the path 300, the processor 33 generates a next path. However, when the vehicle 1 travels beyond the end point P1f of the path 300, the processor 33 calculates a steering amount for traveling on a tangent 301 of the end point P1f of the path 300. Accordingly, simply by the vehicle 1 travels backward at the beginning, the next path is successfully generated via the end point P1f of the original path 300.

Figure 5:
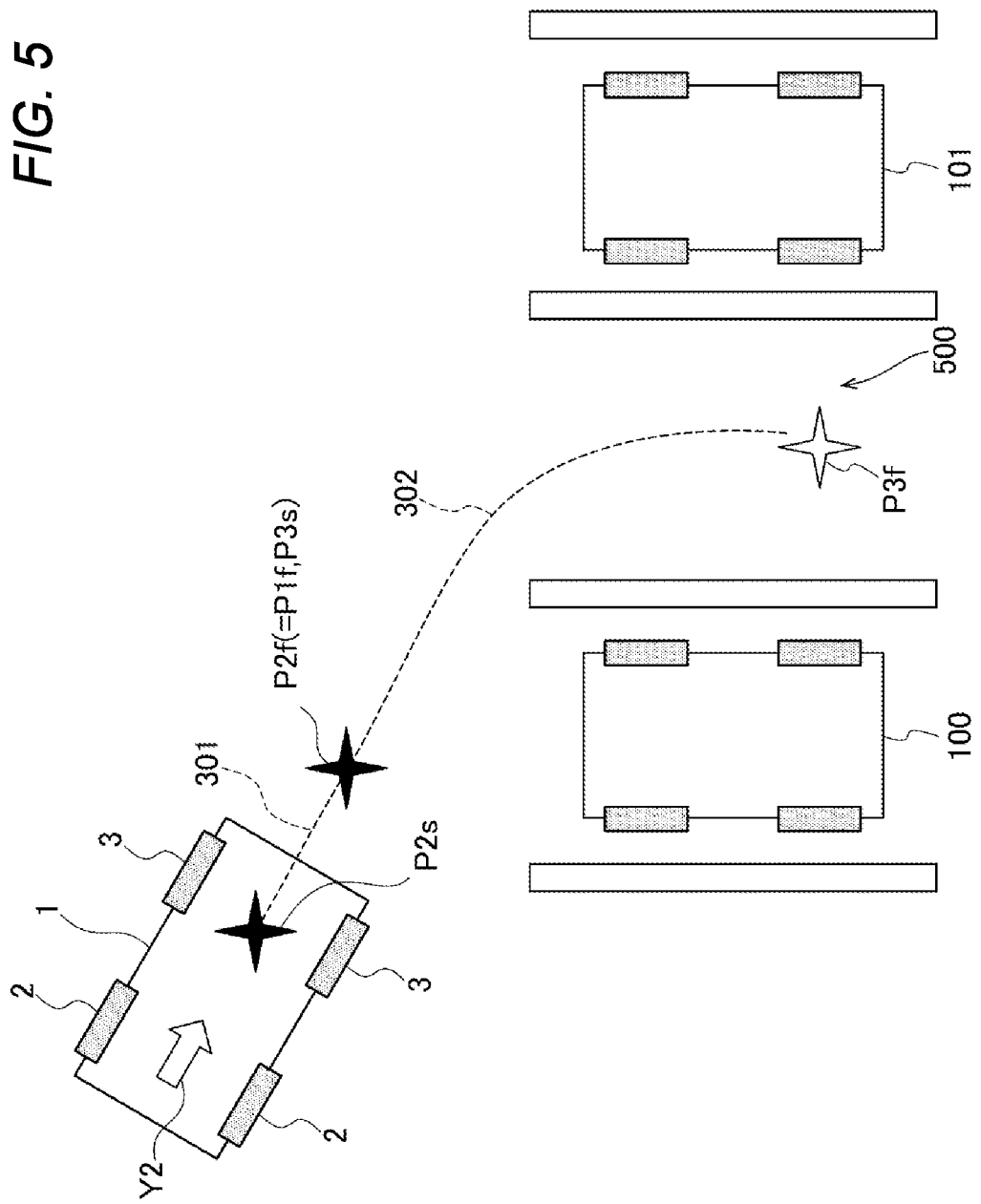
FIG. 5 is a diagram schematically showing a state when the parking assistance apparatus mounted on the vehicle of the first embodiment generates a second path.

FIG. 5 is a diagram schematically showing a state when the processor 33 generates a second path (the tangent 301 and a path 302). The processor 33 changes the vehicle wheel angles of the steered wheels 2 based on the tangent 301 so as to guide the vehicle 1 from a start point P2s to an end point P2f of the tangent 301 (substantially the same position as that of the end point P1f). A guiding direction in this case is a backward direction (a direction indicated by an arrow Y2 is a backward direction). That is, the processor 33 generates the next path by generating the path 302 via the tangent 301. In this case, a start point P3s of the path 302 is at substantially the same position as that of the end point P2f of the tangent 301. After generating the second path (the tangent 301 and the path 302) at one time, the processor 33 guides the vehicle 1 to an end point P3f in the empty space 500. A guiding direction in this case is a backward direction. The "end point P3f" is a "target position" of the second path, and is a final target position when viewed from the entire path.

Accordingly, when the vehicle 1 travels beyond the end point P1f of the path 300, the processor 33 calculates a steering amount for traveling on the tangent 301 of the end point P1f of the path 300. Accordingly, simply by the vehicle 1 traveling straight (forward/backward) along the tangent 301, the second path (the tangent 301 and the path 302) is successfully generated via the end point P1f of the original path 300.

The processor 33 outputs an image of a moving state of the vehicle 1 to the monitor 60 while performing parking assistance.

Figure 6:
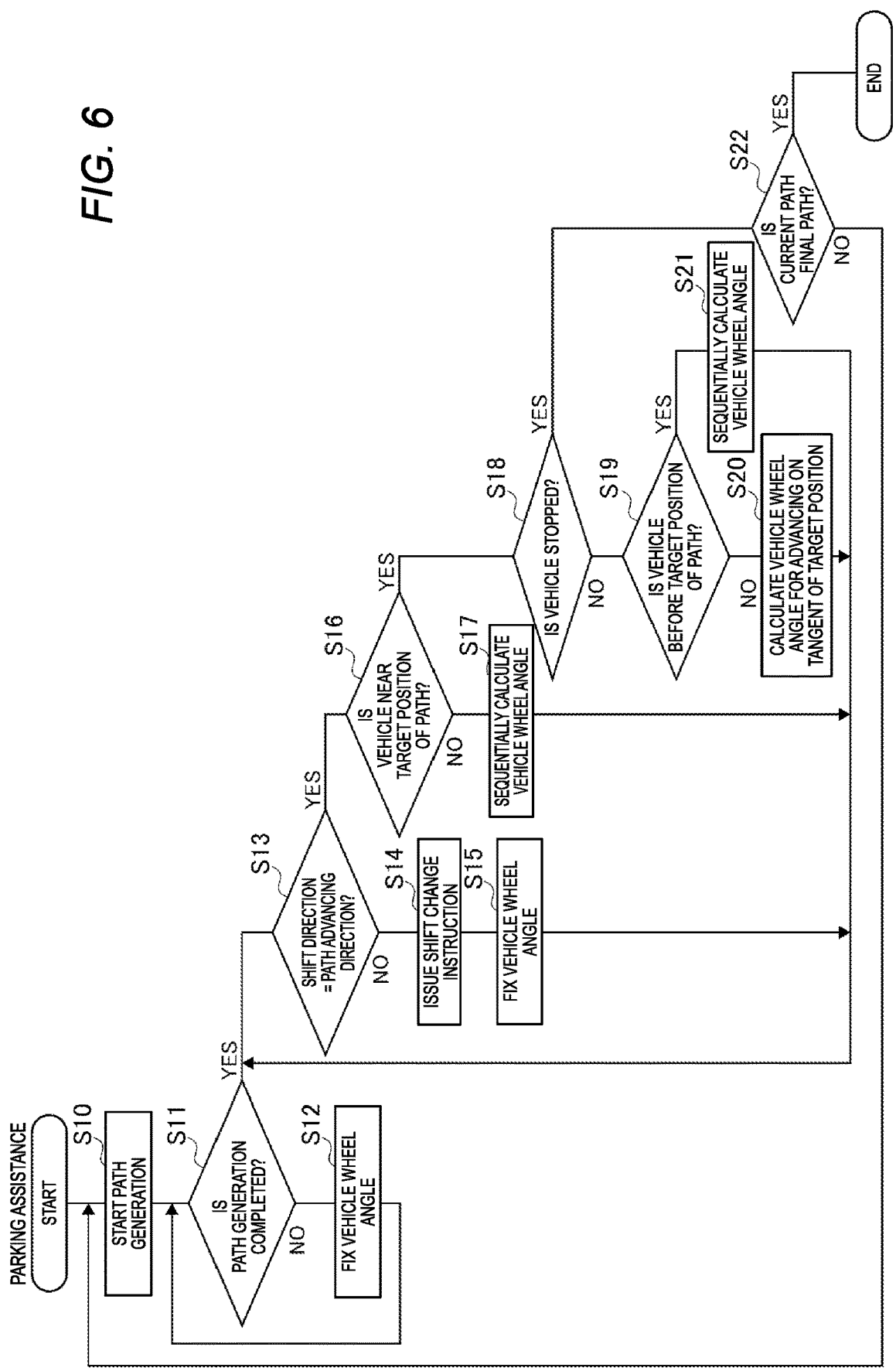
FIG. 6 is a flowchart for illustrating operations of a processor that constitutes the parking assistance apparatus mounted on the vehicle of the first embodiment.

Next, the parking assistance processing by the processor 33 of the vehicle 1 of the first embodiment will be described. FIG. 6 is a flowchart for illustrating operations of the processor 33. In FIG. 6, when starting parking assistance, the processor 33 first starts path generation (step S10). Next, the processor 33 determines whether the path generation has been completed (step S11). When determining that the path generation is being performed (when "NO" is determined in step S11), the processor 33 fixes the vehicle wheel angles of the steered wheels 2 (step S12) and returns to the determination of step S11. That is, the vehicle wheel angles of the steered wheels 2 are fixed during the path generation.

When determining that the path generation has been completed (when "YES" is determined in step S11), the processor 33 determines whether a shift direction and a path advancing direction are the same (step S13). When determining that the shift direction is different from the path traveling direction (when "NO" is determined in step S13), the processor 33 issues a shift change instruction to the driver (step S14), fixes the vehicle wheel angles of the steered wheels 2 (step S15), and returns to the determination of step S13. That is, while the shift direction is different from the path advancing direction, the shift change instruction is issued, and the vehicle wheel angles of the steered wheels 2 are fixed. The processor 33 displays the shift change instruction on the monitor 60 or causes the speaker 61 to output sound.

When determining that the shift direction and the path advancing direction are the same (when "YES" is determined in step S13), the processor 33 determines whether the vehicle 1 has reached a vicinity of a target position of a path (step S16). When determining that the vehicle 1 is not in the vicinity of the target position of the path (when "NO" is determined in step S16), the processor 33 calculates vehicle wheel angles (step S17). After the vehicle wheel angles are calculated, the processor 33 returns to step S13. The processor 33 sequentially performs the vehicle wheel angle calculation until the vehicle 1 reaches the vicinity of the target position of the path. When determining that the vehicle 1 is in the vicinity of the target position of the path (when "YES" is determined in step S16), the processor 33 determines whether the vehicle 1 is in a stopped state (step S18). When determining that the vehicle 1 is not in the stopped state (when "NO" is determined in step S18), the processor 33 determines whether the vehicle 1 is before the target position of the path (step S19).

When determining that the vehicle 1 is not before the target position of the path (when "NO" is determined in step S19), that is, when determining that the vehicle 1 has traveled beyond the target position of the path, the processor 33 calculates vehicle wheel angles for advancing on a tangent of the target position of the path (step S20). After the vehicle wheel angles for advancing on the tangent of the target position of the path are calculated, the processor 33 returns to step S13. When determining that the vehicle 1 is before the target position of the path (when "YES" is determined in step S19), that is, when determining that the vehicle 1 has not reached the target position of the path, the processor 33 calculates vehicle wheel angles (step S21). After the vehicle wheel angles are calculated, the processor 33 returns to step S13. The processor 33 sequentially performs the vehicle wheel angle calculation until the vehicle 1 reaches the target position of the path.

When determining in the determination of step S18 that the vehicle 1 is stopped (when "YES" is determined in step S18), the processor 33 determines whether a current path is a final path (step S22). When determining that the current path is the final path (when "YES" is determined in step S22), the processor 33 ends this processing. When determining that the current path is not the final path (when "NO" is determined in step S22), the processor 33 returns to step S13.

As described above, the vehicle 1 of the first embodiment generates the path to the target position, and changes the vehicle wheel angles of the steered wheels 2 based on the generated path, so that parking at the target position can be assisted. When traveling beyond the target position of the path, the vehicle 1 changes the vehicle wheel angles of the steered wheels 2 so as to advance in the tangential direction of the target position of the path. Therefore, simply by the vehicle 1 advancing (forward/backward) in the tangential direction, a new path is successfully generated via the target position of the original path.

The parking assistance processing of the vehicle 1 of the first embodiment can be applied not only when the driver operates the accelerator, the brake and the shift, but also when a system operates the accelerator, the brake, and the shift. Further, the parking assistance processing of the vehicle 1 of the first embodiment can be applied not only when the path generation is performed for generation of each path, but also when the final target position is generated at one time.

Second Embodiment

In the vehicle 1 of the above-described first embodiment, when traveling beyond the target position of the path, the vehicle 1 changes the vehicle wheel angles of the steered wheels 2 so as to advance in the tangential direction of the target position of the path. However, in a vehicle 70 of a second embodiment, the vehicle 70 travels with vehicle wheel angles of the steered wheels 2 being set to vehicle wheel angles within a predetermined range with reference to vehicle wheel angles at a target position. Although the vehicle wheel angles are substantially fixed, there is a play. Therefore, the vehicle wheel angles are set within a predetermined range. For example, within ±1 degree, within 2 degrees, within 3 degrees, within 4 degrees, or within 5 degrees. A processing other than the processing when the vehicle 70 travels beyond a target position of a path is the same as the processing of the vehicle 1 of the first embodiment. Further, since a configuration of the vehicle 70 of the second embodiment is the same as the configuration of the vehicle 1 of the first embodiment, FIGS. 1 and 3 will be referred to when necessary for explanation.

Figure 7:
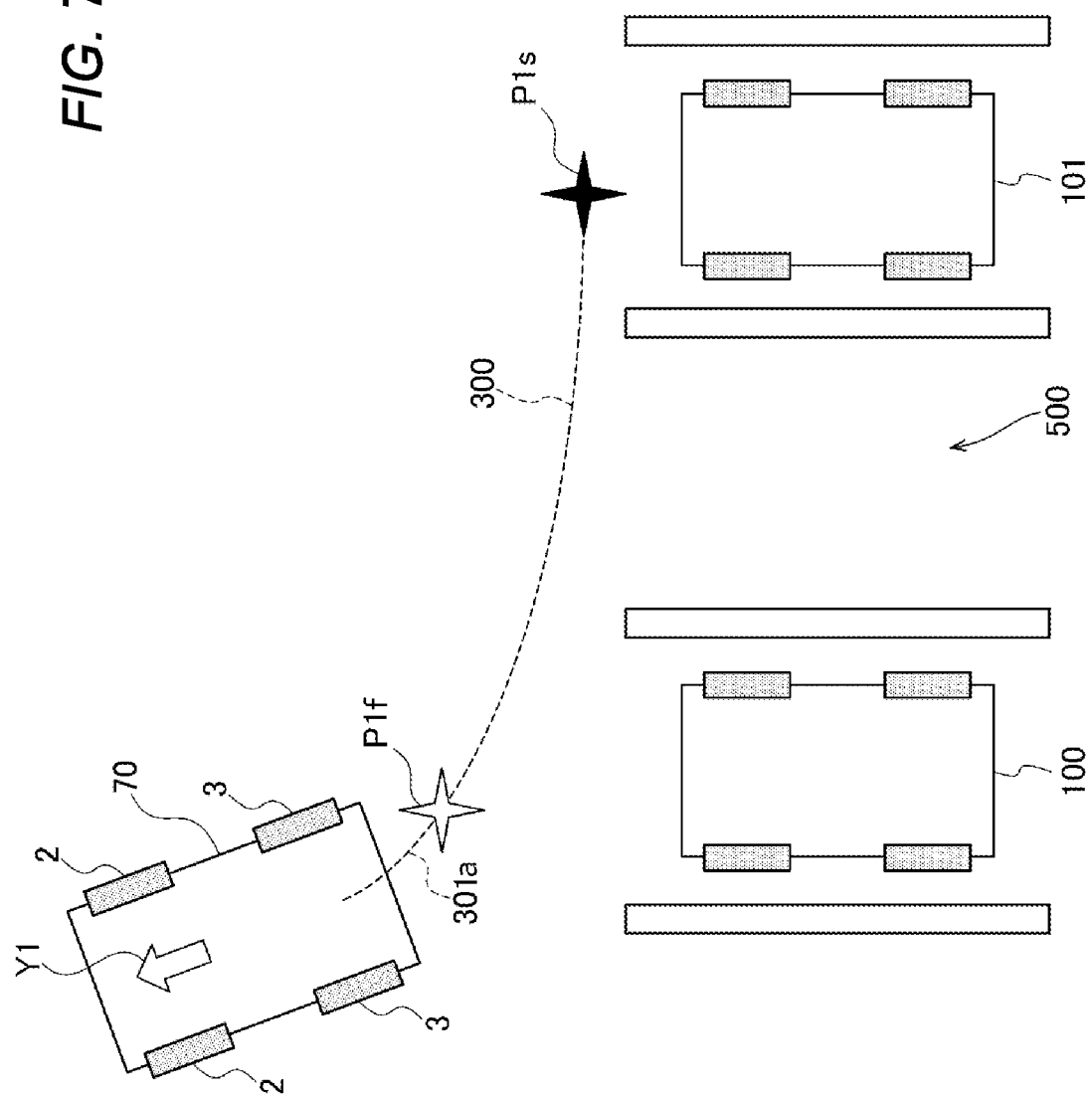
FIG. 7 is a diagram schematically showing a state when a parking assistance apparatus mounted on a vehicle of a second embodiment generates a first path.

In the vehicle 70 of the second embodiment, control when the target position of the path is exceeded is as follows. FIG. 7 is a diagram schematically showing a state when the vehicle 70 starts parking assistance and generates a first path 300. In FIG. 7, when the vehicle 70 starts parking toward the empty space 500 between the vehicle 100 and the vehicle 101, the processor 33 first generates the path 300. In this case, a start point of the path 300 is P1s and an end point is P1f. As described above, the "end point" is the "target position". When a driver operates the accelerator, the brake, or the shift after the path 300 is generated, the processor 33 changes the vehicle wheel angles of the steered wheels 2 based on the generated path 300, so that the vehicle 70 is guided to the end point P1f of the path 300. A guiding direction in this case is a forward direction (a direction indicated by an arrow Y1 is a forward direction). The processor 33 sequentially calculates vehicle wheel angles for traveling on the path 300. That is, the processor 33 calculates a vehicle wheel angle from a curvature of the path 300 and also calculates a vehicle wheel angle for correcting a deviation of the vehicle 70 from the path 300. The curvature is a reciprocal of a rotation radius.

When guiding the vehicle 70 to the end point P1f of the path 300, the processor 33 generates a next path. When the vehicle 70 reaches the end point P1f of the path 300, the processor 33 fixes the vehicle wheel angles of the steered wheels 2 at that time point. That is, the vehicle wheel angles of the steered wheels 2 are fixed by the vehicle wheel angles calculated from the curvature of the end point P1f that is the target position. Accordingly, when traveling beyond the end point P1f of the path 300, the vehicle 70 travels with the fixed vehicle wheel angles. The vehicle wheel angles of the steered wheels 2 are fixed, so that the curvature becomes constant. When generating the next path, if the vehicle 70 travels backward along an arc 301a, the next path is successfully generated via the end point P1f of the original path 300. The vehicle wheel angles at the end point P1f may be 0 degrees. In this case, when the vehicle 70 travels straight or travels backward along the straight line 301a, the next path can be generated via the end point P1f of the original path 300.

Figure 8:
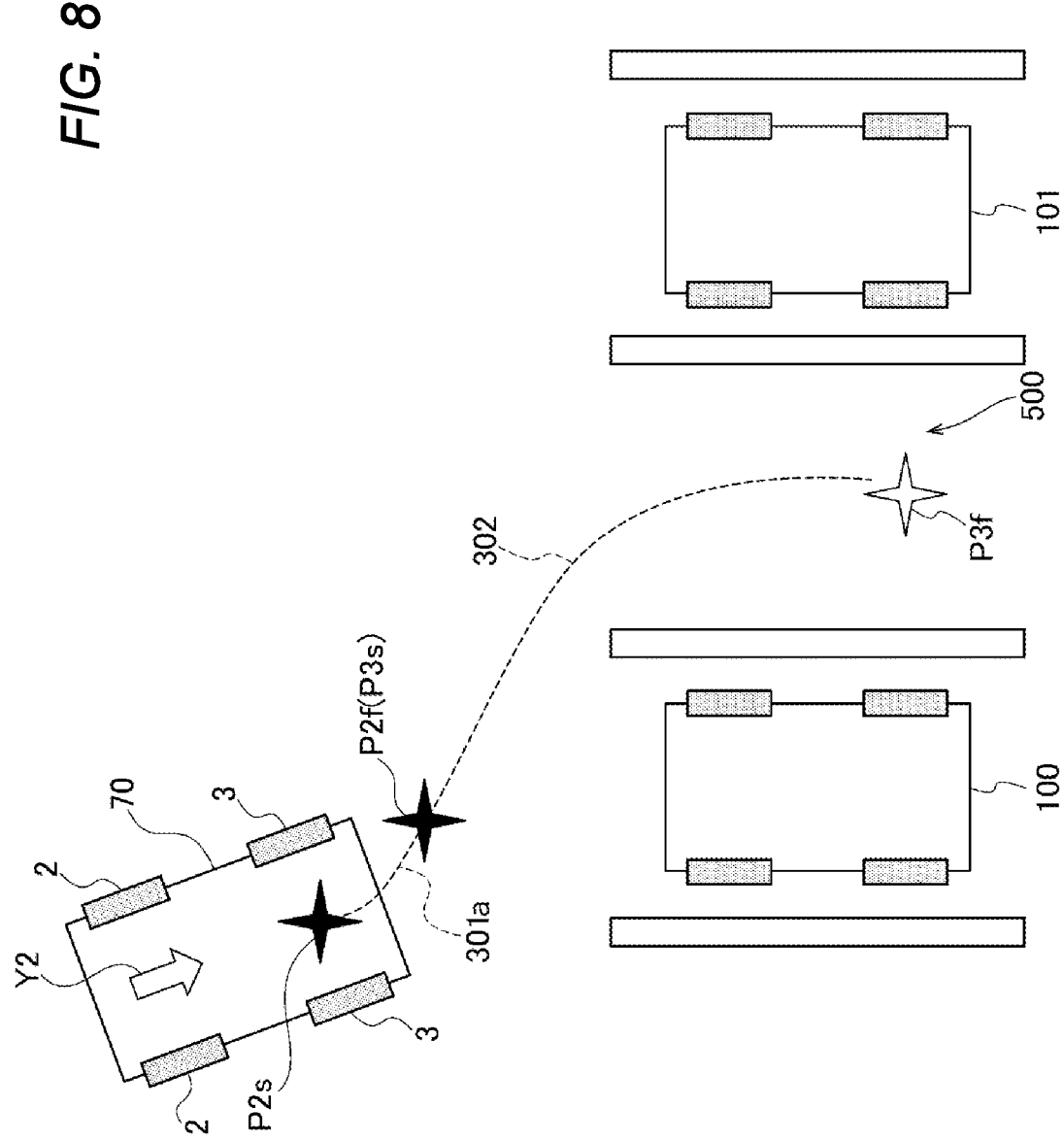
FIG. 8 is a diagram schematically showing a state when the parking assistance apparatus mounted on the vehicle of the second embodiment generates a second path.

FIG. 8 is a diagram schematically showing a state when the processor 33 generates a second path (the arc 301a and the path 302). The processor 33 guides the vehicle 70 from the start point P2s to the end point P2f of the arc 301a (substantially the same position as that of the end point P1f) by causing, based on the arc 301a, the vehicle 70 to travel backward while the vehicle wheel angles of the steered wheels 2 are fixed. A guiding direction in this case is a backward direction (a direction indicated by an arrow Y2 is a backward direction). That is, the processor 33 generates the next path by generating the path 302 via the arc 301a. In this case, the start point P3s of the path 302 is substantially at the same position as that of the end point P2f of the arc 301a. After generating the second path (the arc 301a and the path 302) at one time, the processor 33 guides the vehicle 70 to the end point P3f in the empty space 500. A guiding direction in this case is a backward direction.

Accordingly, when the vehicle 70 travels beyond the end point P1f of the path 300, the processor 33 fixes the vehicle wheel angles of the steered wheels 2 at a time point when the vehicle 70 reaches the end point P1f of the path 300. Accordingly, simply by the vehicle 70 traveling backward along the arc 301a, the second path (the arc 301a and the path 302) is successfully generated via the end point P1f of the original path 300.

Figure 9:
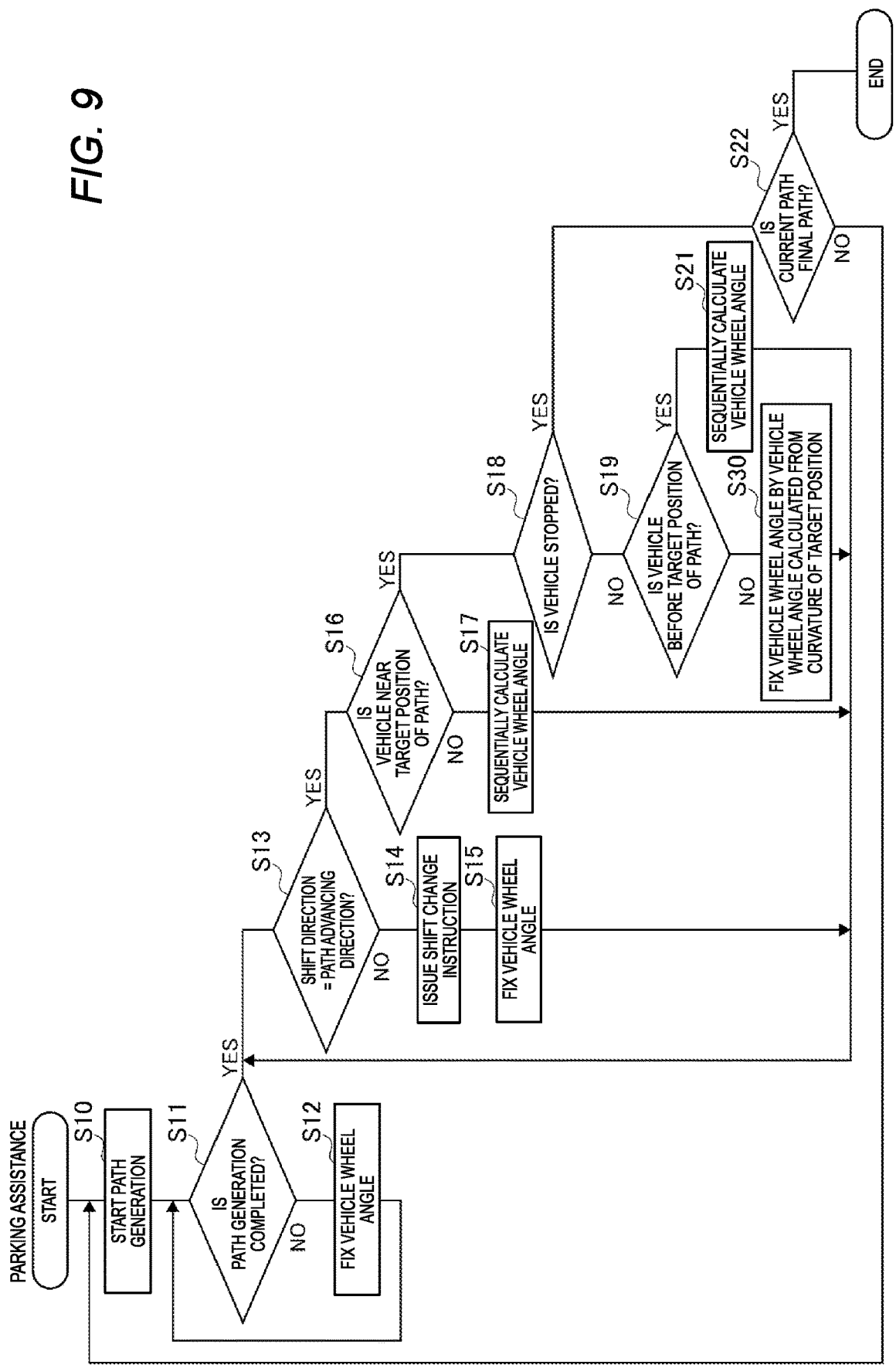
FIG. 9 is a flowchart for illustrating operations of a processor that constitutes the parking assistance apparatus mounted on the vehicle of the second embodiment.

Next, a parking assistance processing by the processor 33 of the vehicle 70 of the second embodiment will be described. FIG. 9 is a flowchart for illustrating operations of the processor 33 of the vehicle 70. In FIG. 9, since processings of steps S10 to S19 and steps S21 and S22 are the same as those of the operations of the vehicle 1 described above in FIG. 6, descriptions of these processings will be omitted.

When determining in step S18 that the vehicle 70 is not stopped ("NO" is determined in step S18), and in step S19 that the vehicle 70 is not before the target position of the path, that is, the vehicle 70 has reached the target position ("NO" is determined in step S19), the processor 33 fixes the vehicle wheel angles of the steered wheels 2 by vehicle wheel angles calculated from the curvature of the target position (step S30). After the vehicle wheel angles of the steered wheels 2 are fixed, the processor 33 returns to step S13.

As described above, the vehicle 70 of the second embodiment generates the path to the target position, and changes the vehicle wheel angles of the steered wheels 2 based on the generated path, so that parking at the target position can be assisted. When the vehicle 70 travels beyond the target position of the path, the vehicle wheel angles of the steered wheels 2 are fixed to the vehicle wheel angles within a predetermined range with reference to the vehicle wheel angles at the target position. Therefore, simply by the vehicle 70 traveling backward along the arc, or traveling straight or traveling backward, the new path is successfully generated via the target position of the original path.

The parking assistance processing of the vehicle 70 of the second embodiment can be applied not only when the driver operates an accelerator, a brake, and a shift, but also when a system operates the accelerator, the brake, and the shift. Further, the parking assistance processing of the vehicle 70 of the second embodiment can be applied not only when the path generation is performed for generation of each path, but also when the final target position is generated at one time.

Third Embodiment

A vehicle 71 of a third embodiment allows a driver to return to a first position even when the driver causes the vehicle 71 to travel in reverse while the processor 33 generates a path at the first position. A processing other than the processing when the vehicle 71 travels in reverse during path generation is the same as the processing of the vehicle 1 of the first embodiment or the processing of the vehicle 70 of the second embodiment. Further, since a configuration of the vehicle 71 of the third embodiment is the same as the configuration of the vehicle 1 of the first embodiment, FIGS. 1 and 3 will be referred to when necessary for explanation.

Figure 10:
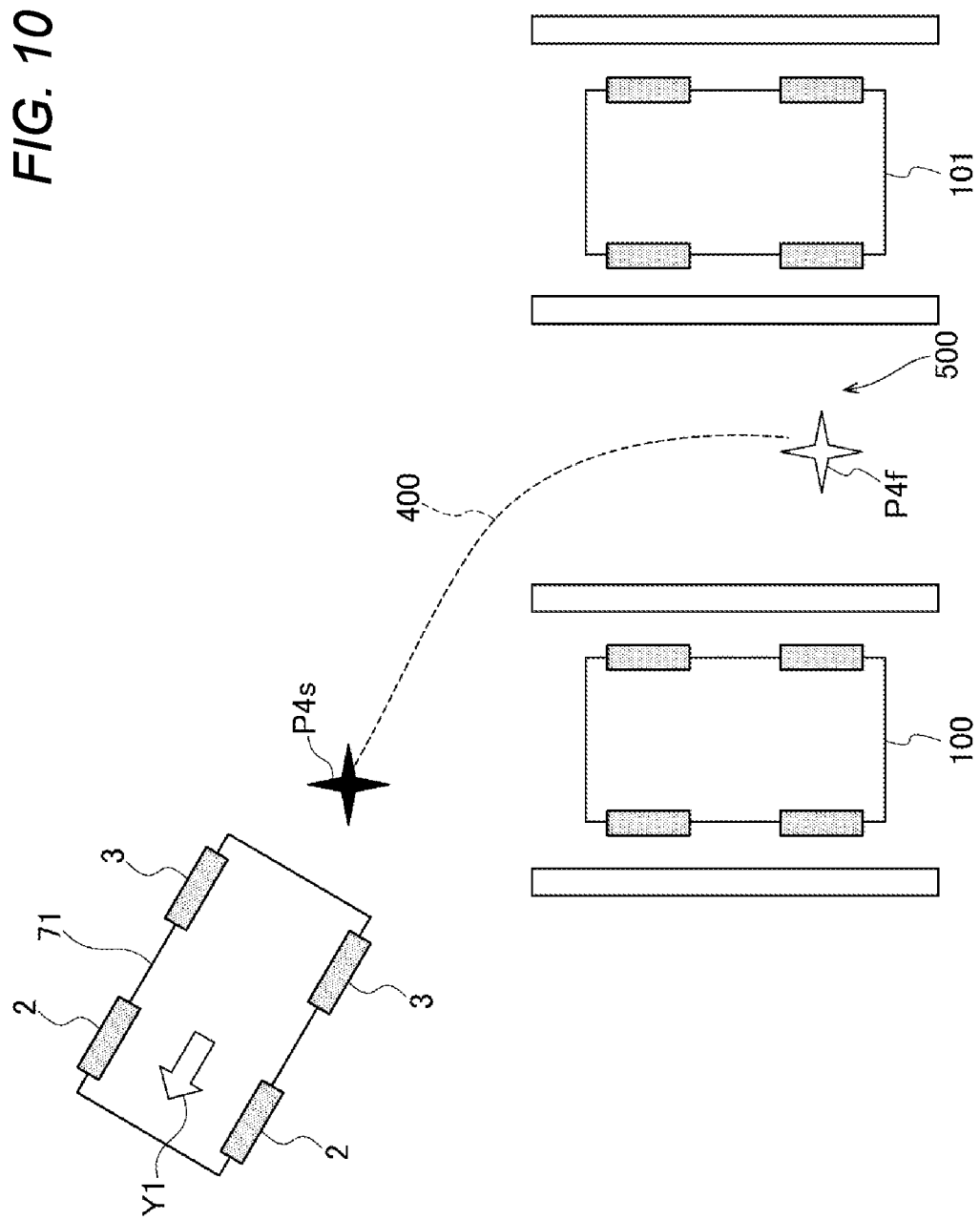
FIG. 10 is a diagram schematically showing a state when a parking assistance apparatus mounted on a vehicle of a third embodiment generates a path.

Control when the driver causes the vehicle 71 to travel in reverse while the processor 33 generates the path at the first position is as follows. FIG. 10 is a diagram schematically showing a state where the vehicle 71 attempts to generate at the first position a path to a second position (target position). In FIG. 10, the processor 33 starts, at a first position P4s, generation of a path 400 to a second position P4f in order to park toward the empty space 500 between the vehicle 100 and the vehicle 101. The path 400 is a path on which the vehicle 71 travels backward. However, when the driver causes the vehicle 71 to travel forward, the correct path 400 to the second position P4f cannot be generated.

Therefore, when generating the path 400 at the first position P4s, the vehicle 71 advances with the processor 33 setting vehicle wheel angles of the steered wheels 2 to vehicle wheel angles within a predetermined range with reference to vehicle wheel angles at the first position P4s. Although the vehicle wheel angles are substantially fixed, there is a play. Therefore, there is the predetermined range. For example, within ±1 degree, within 2 degrees, within 3 degrees, within 4 degrees, or within 5 degrees. When the vehicle wheel angles of the steered wheels 2 are fixed in this way, even when the vehicle 71 travels forward, the vehicle 71 can return to the first position (a start point of the path 400 (first position P4s)) after being in a correct advancing direction (backward direction), and the path 400 is successfully generated. When the vehicle 71 is parked at a predetermined position between the first position P4s and the second position P4f of the path 400, the vehicle 71 advances with the processor 33 setting the vehicle wheel angles of the steered wheels 2 to vehicle wheel angles within a predetermined range with reference to vehicle wheel angles at the predetermined position. In this case as well, although the vehicle wheel angles are substantially fixed, there is a play. Therefore, there is the predetermined range. For example, within ±1 degree, within 2 degrees, within 3 degrees, within 4 degrees, or within 5 degrees. Further, it goes without saying that the processing in this case is performed while the processor 33 generates a path.

Processings of fixing the vehicle wheel angles of the steered wheels 2 during path generation are steps S11 and S12 of FIG. 6 or FIG. 9. That is, as described above, the processor 33 starts the path generation (step S10) and fixes the vehicle wheel angles of the steered wheels 2 during the path generation ("NO" in step S11) (step S12).

As described above, the vehicle 71 of the third embodiment generates, at the first position P4s, the path 400 to the second position P4f, and changes the vehicle wheel angles of the steered wheels 2 based on the generated path 400, so that parking at the second position P4f can be assisted. When the path 400 is being generated at the first position P4s, the vehicle 71 advances with the vehicle wheel angles of the steered wheels 2 fixed to the vehicle wheel angles within a predetermined range with reference to the vehicle wheel angles at the first position P4s (or the predetermined position between the first position P4s and the second position P4f). Therefore, after the vehicle 71 is in the correct advancing direction, the vehicle 71 can return to the first position P4s, and the path 400 is successfully generated.

The parking assistance processing of the vehicle 71 of the third embodiment can be applied not only when the driver operates an accelerator, a brake, and a shift, but also when a system operates the accelerator, the brake, and the shift. Further, the parking assistance processing of the vehicle 71 of the third embodiment can be applied not only when the path generation is performed for generation of each path, but also when the final target position is generated at one time.

Fourth Embodiment

The vehicle 71 of the above-described third embodiment fixes the vehicle wheel angles of the steered wheels 2 while generating the path 400 at the first position P4s (or the predetermined position between the first position P4s and the second position P4f). However, a vehicle 72 of a fourth embodiment fixes vehicle wheel angles of the steered wheels 2 after a path is generated.

A reason why the vehicle wheel angles of the steered wheels 2 are fixed after the path is generated is as follows. During parking assistance, a path to a target position for parking is generated. However, in a system that requires a shift operation of the driver, it is considered that the vehicle may travel in a direction opposite to an assumed advancing direction of the path due to carelessness or the like of the driver. For example, when traveling forward is performed on a path where traveling backward is assumed, it is considered that steering becomes unstable because a vehicle travels in reverse on the path. In such a case, even when the driver switches to a correct shift direction after the reverse traveling, it may be difficult to advance to an end point of the path as it is, and the parking assistance may not be completed.

Therefore, when the advancing direction of the path and the shift direction do not coincide with each other, the vehicle wheel angles of the steered wheels 2 are fixed to vehicle wheel angles at the start of traveling until the advancing direction of the path and the shift direction coincide with each other. Accordingly, when a vehicle travels in reverse while keeping optional vehicle wheel angles and the advancing direction of the path and the shift direction coincide with each other, in a case where the vehicle travels in the advancing direction of the path with the optional vehicle wheel angles, the vehicle can return to a position at the start of the reverse traveling and can be guided to an end point of the path, that is, a target position.

A processing other than the processing when the vehicle 72 travels in reverse after the path is generated is the same as the processing of the vehicle 1 of the first embodiment or the processing of the vehicle 70 of the second embodiment. Further, since a configuration of the vehicle 72 of the fourth embodiment is the same as the configuration of the vehicle 1 of the first embodiment, FIGS. 1 and 3 will be referred to when necessary for explanation.

Figure 11:
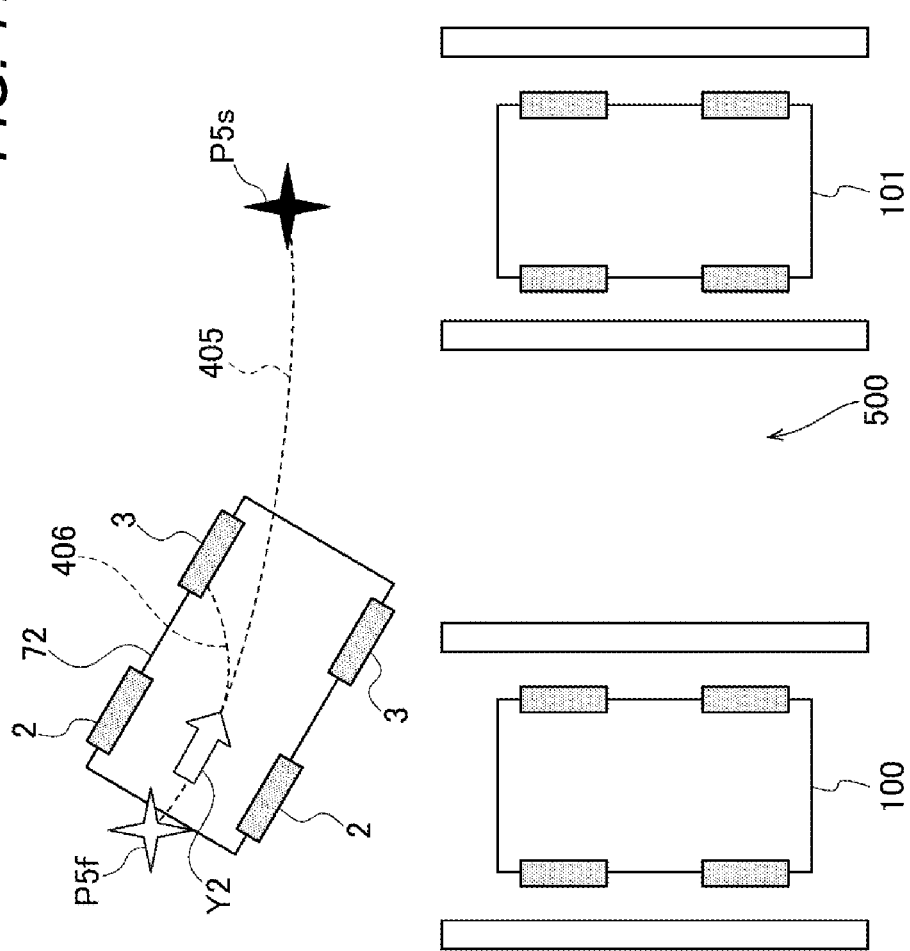
FIG. 11 is a diagram schematically showing a state when a parking assistance apparatus mounted on a vehicle of a fourth embodiment generates a path.

Control when the driver causes the vehicle 72 to travel in reverse after the processor 33 generates a path at a first position will be described with reference to FIG. 11. FIG. 11 is a diagram schematically showing a state where the vehicle 72 attempts to generate, at a first position P5s, a path to a second position P5f. In FIG. 11, the processor 33 generates, at the first position P5s, a path 405 to the second position P5f in order to park toward the empty space 500 between the vehicle 100 and the vehicle 101. The generated path 405 is a path on which the vehicle 72 travels forward. However, when the driver causes the vehicle 72 to travel backward (that is, traveling in reverse in a direction of an arrow Y2), the vehicle 72 will deviate from the path 405 and steering becomes unstable. However, even when a shift is switched to a correct shift at a time point when the vehicle 72 deviates from the path 405, it is difficult to advance to an end point of the path as it is and parking assistance cannot be completed.

Therefore, after generating the path 405 at the first position P5s, the processor 33 sets the vehicle wheel angles of the steered wheels 2 to a value within a predetermined range when an advancing direction of the path 405 and a shift direction do not coincide with each other. That is, the vehicle wheel angles of the steered wheels 2 are fixed by vehicle wheel angles when reverse traveling is started. In this case, although the vehicle wheel angles of the steered wheels 2 are substantially fixed, there is a play. Therefore, there is the predetermined range. For example, within ±1 degree, within 2 degrees, within 3 degrees, within 4 degrees, or within 5 degrees. Accordingly, the vehicle 72 travels in reverse on a path 406 obtained with the vehicle wheel angles set to the value within a predetermined range. When the vehicle wheel angles of the steered wheels 2 are fixed, the shift is switched to traveling forward, so that the vehicle 72 can return to the original path 405. Accordingly, even when traveling in reverse on the path due to an operation error of the driver, the vehicle 72 can be continuously guided to the final target position. Needless to say, when the advancing direction of the path 405 and the shift direction coincide with each other, the vehicle wheel angles of the steered wheels 2 are changed based on the path 405.

Processings of fixing the vehicle wheel angles of the steered wheels 2 after the path is generated are steps S13 to S15 of FIG. 6 or FIG. 9. That is, as described above, when the shift direction does not coincide with the path advancing direction after the path is generated ("NO" is determined in step S13), the processor 33 issues a shift change instruction (step S14) and fixes the vehicle wheel angles of the steered wheels 2 (step S15).

As described above, when the advancing direction of the generated path and the shift direction coincide with each other after the path is generated, the vehicle 72 of the fourth embodiment changes the vehicle wheel angles of the steered wheels 2 based on the generated path. However, when the advancing direction of the generated path and the shift direction do not coincide with each other, the vehicle 72 sets the vehicle wheel angles of the steered wheels 2 to the value within a predetermined range. Therefore, even when traveling in reverse on the path due to a shift operation error of the driver, the vehicle 72 can be guided to the final target position.

The parking assistance processing of the vehicle 72 of the fourth embodiment can be applied not only when the path generation is performed for generation of each path, but also when the final target position is generated at one time.

Fifth Embodiment

A vehicle 73 of a fifth embodiment can reduce a load on an electric power steering due to stationary steering.

Figure 12:
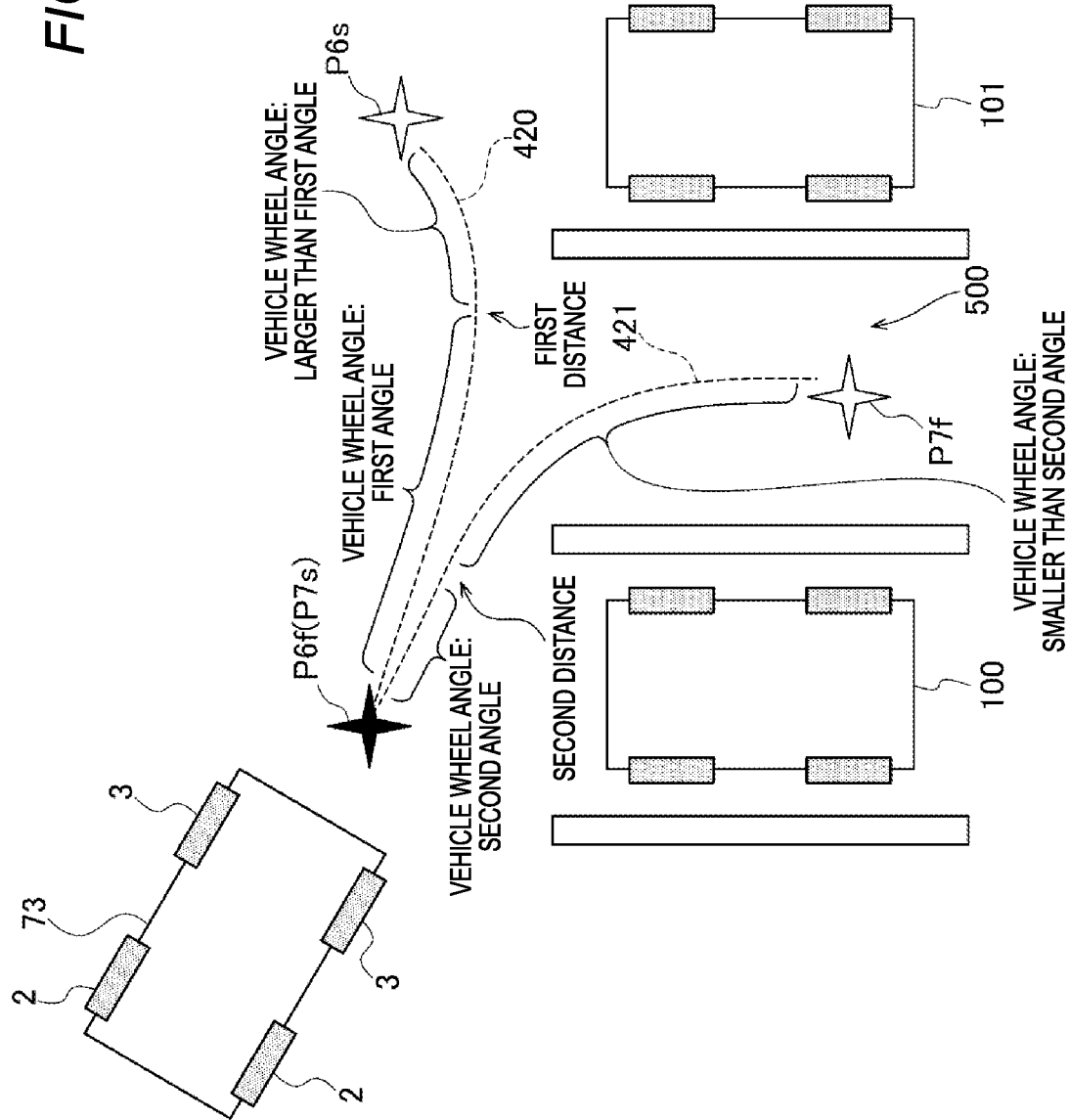
FIG. 12 is a diagram schematically showing a state when a parking assistance apparatus mounted on a vehicle of a fifth embodiment generates paths.

FIG. 12 is a diagram schematically showing a state when the vehicle 73 starts parking assistance, generates two paths 420 and 421, and advances to a final target position. In FIG. 12, when the vehicle 73 performs side-by-side parking (or parallel parking) in the empty space 500 between the vehicle 100 and the vehicle 101, the processor 33 first generates the path in a forward direction (forward path) 420. In this case, a start point of the forward path 420 is P6s and an end point (stop position) is P6f. The "end point P6f" is also a "target position" of the forward path 420 and is also a start point P7s of a next path in a backward direction (backward path) 421. An end point (stop position) of the backward path 421 is P7f.

On the forward path 420, when the vehicle 73 is positioned at a point where a distance from the stop position P6f is larger than a first distance, the processor 33 sets the vehicle wheel angles to a value larger than a first angle, which is a positive value, with respect to a straight-traveling direction (a direction of the vehicle wheels when the vehicle 73 travels straight, that is, a direction in which the vehicle wheel angles are 0 degrees); when the vehicle 73 is positioned at a point where the distance from the stop position P6f is smaller than the first distance, the processor 33 sets the vehicle wheel angles to the first angle with respect to the straight-traveling direction; and when the vehicle 73 is positioned at the stop position P6f, the processor 33 changes the vehicle wheel angles from the first angle to the second angle, which is a negative value, with respect to the straight-traveling direction (that is, stationary steering is performed).

Further, on the backward path 421, when the vehicle 73 is positioned at a point where a distance from the stop position P6f is smaller than a second distance, the processor 33 sets the vehicle wheel angles to a second angle with respect to the straight-traveling direction, and when the vehicle 73 is positioned at a point where the distance from the stop position P6f is larger than the second distance, the processor 33 sets the vehicle wheel angles to a value smaller than the second angle with respect to the straight-traveling direction. The second angle is expressed as a small value because the second angle is a negative value, but an absolute value thereof is large. The vehicle wheel angles at the stop position P6f where the stationary steering is performed are small, so that the load on the electric power steering can be reduced. The first angle and the second angle are appropriately determined, so that it is possible to balance a reduction of the load on the electric power steering due to the stationary steering and a reduction of an increase in the number of stationary steering when the end point of the path is reached.

The first distance and the second distance substantially coincide with each other. Here, the first distance/second distance is, for example, 0.99 or more and 1.01 or less, 0.98 or more and 1.02 or less, 0.95 or more and 1.05 or less, 0.9 or more and 1.1 or less, 0.8 or more and 1.2 or less, or 0.5 or more and 1.5 or less.

An absolute value of the first angle and an absolute value of the second angle substantially coincide with each other. Here, the absolute value of the first angle/absolute value of the second angle is, for example, 0.99 or more and 1.01 or less, 0.98 or more and 1.02 or less, 0.95 or more and 1.05 or less, 0.9 or more and 1.1 or less, 0.8 or more and 1.2 or less, or 0.5 or more and 1.5 or less. The first angle is, for example, plus 20 degrees, and the second angle is, for example, minus 20 degrees.

When the vehicle wheel angles of the vehicle 73 are positive values with respect to the straight-traveling direction, the vehicle 73 turns to left and when the vehicle wheel angles of the vehicle 73 are negative values, the vehicle 73 turns to right, or when the vehicle wheel angles of the vehicle 73 are positive values with respect to the straight-traveling direction, the vehicle 73 turns to right and when the vehicle wheel angles of the vehicle 73 are negative values, the vehicle 73 turns to left. Accordingly, either positive or negative reference may be used.

Figure 13:
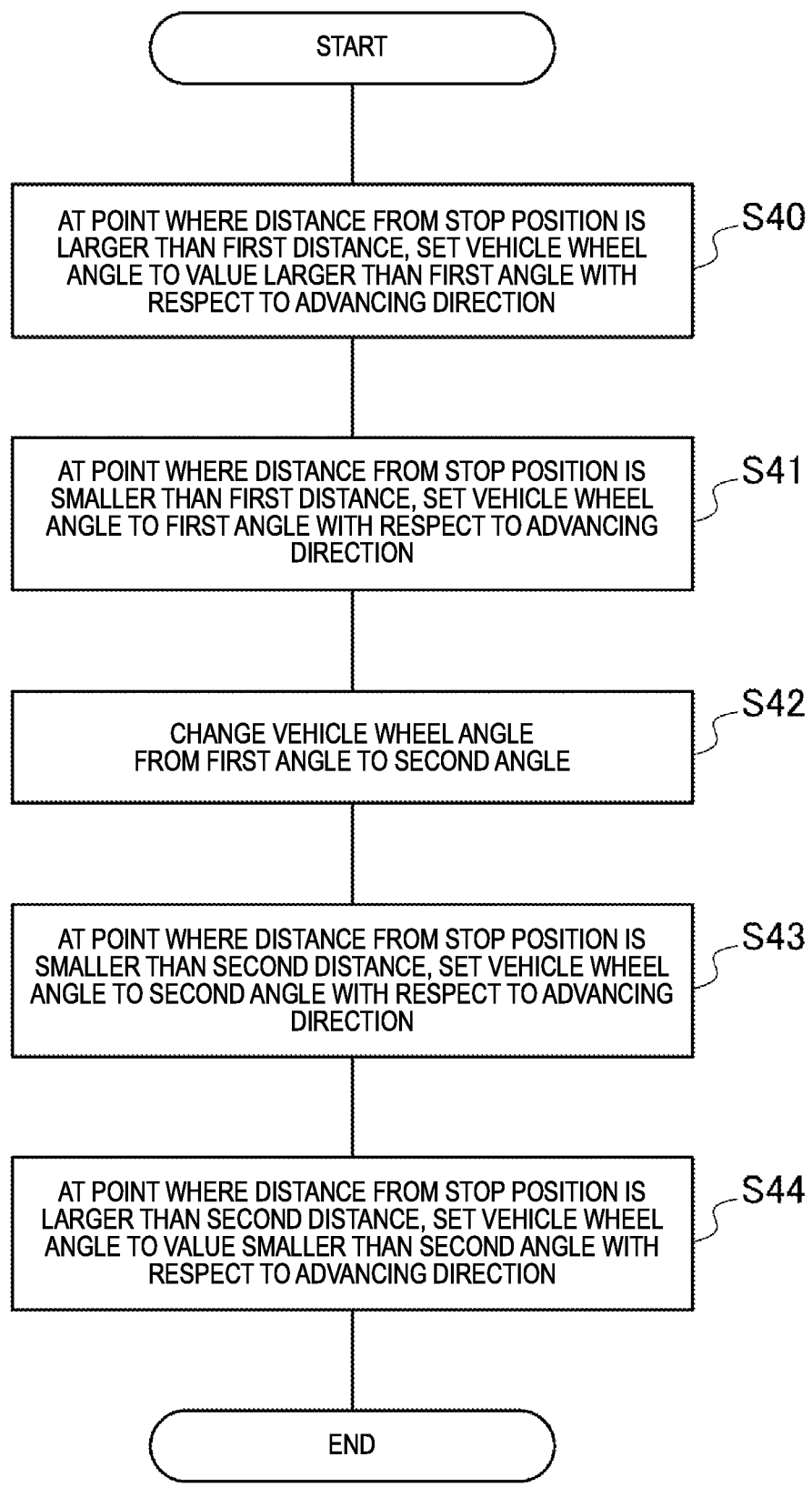
FIG. 13 is a flowchart for illustrating operations of a processor that constitutes the parking assistance apparatus mounted on the vehicle of the fifth embodiment.
Figure 14:
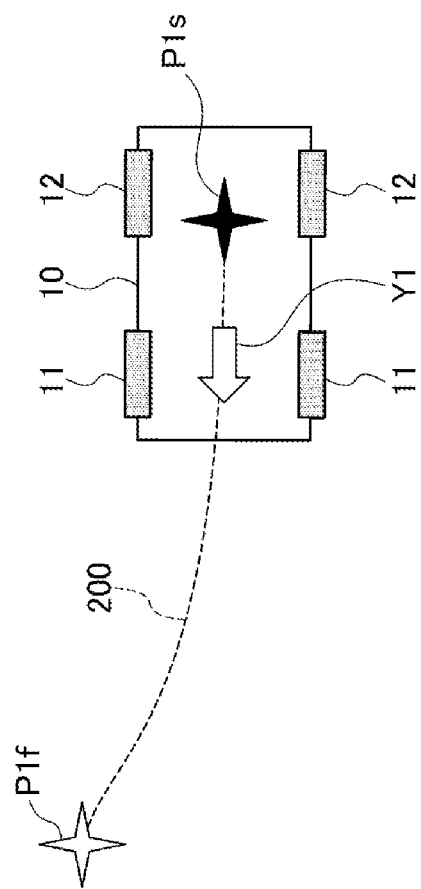
FIG. 14 is a diagram schematically showing a state when a related-art parking assistance apparatus generates a first path.
Figure 15:
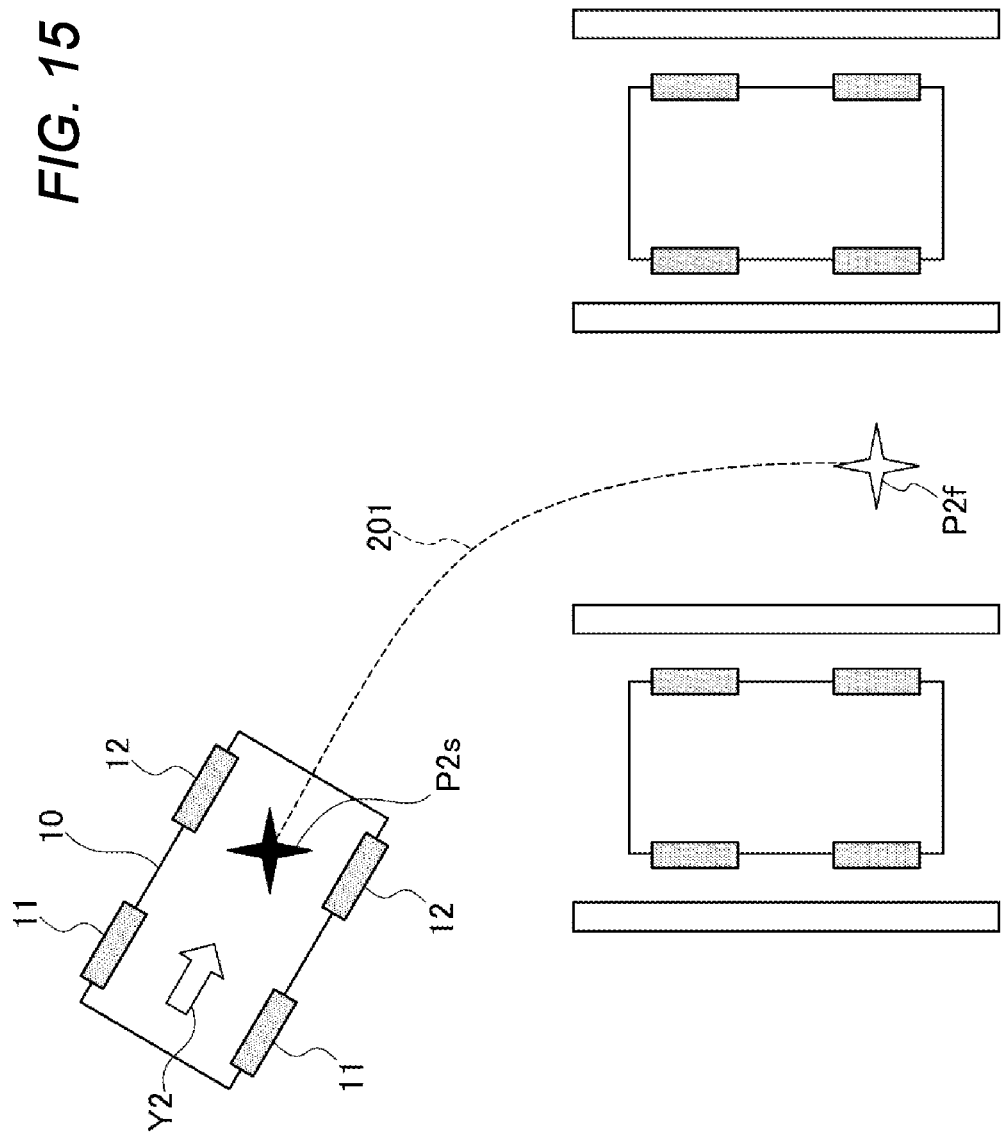
FIG. 15 is a diagram schematically showing a state when the related-art parking assistance apparatus generates a second path.

FIG. 13 is a flowchart for illustrating operations of the processor 33 of the vehicle 73 of the fifth embodiment. In FIG. 13, when the parking assistance is started, at the point where the distance from the stop position P6f is larger than the first distance, the processor 33 sets the vehicle wheel angles of the steered wheels 2 to the value larger than the first angle with respect to the advancing direction (step S40). Next, at the point where the distance from the stop position P6f is smaller than the first distance, the processor 33 sets the vehicle wheel angles of the steered wheels 2 to the first angle with respect to the advancing direction (step S41). Next, the processor 33 changes the vehicle wheel angles of the steered wheels 2 from the first angle to the second angle (step S42). Next, at the point where the distance from the stop position P6f is smaller than the second distance, the processor 33 sets the vehicle wheel angles of the steered wheels 2 to the second angle with respect to the advancing direction (step S43). Next, at the point where the distance from the stop position P6f is larger than the second distance, the processor 33 sets the vehicle wheel angles of the steered wheels 2 to the value smaller than the second angle with respect to the advancing direction (step S44).

As described above, since the vehicle 73 of the fifth embodiment limits the vehicle wheel angles from a position before the end point of the path P6f, when the end point of the path P6f is reached, the vehicle wheel angles at which the stationary steering is allowed can be controlled to be small and the load on the electric power steering can be reduced. That is, a current of the electric power steering can be reduced so as to prevent heat generation.

The parking assistance processing of the vehicle 73 of the fifth embodiment can also be applied to an automatic parking system that automatically performs vehicle speed control.

Further, in the vehicles 1 and 70 to 73 in the above-described first to fifth embodiments, although control for the side-by-side parking (or parallel parking) has been described, perpendicular parking can also be similarly controlled.

Further, the vehicles 1 and 70 to 73 in the above-described first to fifth embodiments are four-wheeled vehicles each including a total of four vehicle wheels 2, two vehicle wheels on a front side and two vehicle wheels on a rear side, but the number of vehicle wheels is not limited as long as two or more vehicle wheels are provided for a vehicle.

Further, although the above-described first to fifth embodiments have been described on a premise of two forward and backward paths, three or more paths can be similarly controlled.

The present disclosure provides a vehicle configured to assist parking at a predetermined position by generating a path to the predetermined position and changing, based on the path, at least a vehicle wheel angle of a steered wheel, the vehicle including: at least one steered wheel; at least one driven wheel; a power unit configured to provide a driving force to the driven wheel; and an operation device configured to receive at least an operation of changing power of the power unit, in which before the predetermined position on the path, the vehicle wheel angle of the steered wheel is changed based on the path, and if the vehicle travels beyond the predetermined position of the path, the vehicle wheel angle of the steered wheel is changed to allow the vehicle to advance in a tangential direction of the predetermined position of the path.

According to the present disclosure, when the vehicle advances beyond the predetermined position of the path, since the vehicle wheel angle of the steered wheel is changed such that the vehicle advances in the tangential direction of the predetermined position, simply by the vehicle advancing (forward/backward) in the tangential direction, a new path can be generated via the predetermined position of the original path.

In the vehicle of the present disclosure having the above-described configuration, the steered wheel and the driven wheel are the same.

According to the present disclosure, even when the steered wheel and the driven wheel are the same, since the vehicle wheel angle of the steered wheel is changed such that the vehicle advances in the tangential direction of the predetermined position of the path, simply by advancing the vehicle in the tangential direction, a new path can be generated via the predetermined position of the original path.

In the vehicle of the present disclosure having the above-described configuration, at least one of the steered wheel and the driven wheel includes a braking mechanism, and the operation device is configured to receive an operation of changing a braking force of the braking mechanism.

According to the present disclosure, the operation device can perform the operation of changing the braking force. For example, when the operation device is a brake pedal, the brake pedal is depressed so as to increase a braking force. When the operation device is, for example, an accelerator pedal, the driving force of the power unit can be changed.

In the vehicle of the present disclosure having the above-described configuration, the power unit includes at least one of an internal combustion engine and an electric motor.

According to the present disclosure, the vehicle can be advanced (forward/backward) by the internal combustion engine, the electric motor, or both the internal combustion engine and the electric motor.

The vehicle of the present disclosure having the above-described configuration includes an electric power steering configured to change the vehicle wheel angle of the steered wheel.

According to the present disclosure, the vehicle wheel angle of the steered wheel can be changed by electric power.

In the vehicle of the present disclosure having the above-described configuration, the at least one steered wheel includes two vehicle wheels and the at least one driven wheel includes two vehicle wheels.

According to the present disclosure, the vehicle can be advanced with at least four vehicle wheels.

The vehicle of the present disclosure having the above-described configuration includes a processor and the processor is configured to generate the path.

According to the present disclosure, the processor can generate the path.

In the vehicle of the present disclosure having the above-described configuration, the processor is configured to generate a next path after the vehicle is stopped.

According to the present disclosure, the vehicle is stopped, so that the next path can be generated. When a stop position is, for example, in the vicinity of an end point of the path, the next path is generated after the vehicle reaches and is stopped in the vicinity of the end point.

The vehicle of the present disclosure having the above-described configuration further includes a camera configured to capture an image of an outside and a display circuit configured to display a second image corresponding to a first image captured by the camera, in which the display circuit is configured to overlap and display the predetermined position on the second image.

According to the present disclosure, for example, it is possible to overlap and display the predetermined position on the second image corresponding to the first image captured by an all-around camera.

The vehicle of the present disclosure having the above-described configuration includes an input circuit, and the input circuit is configured to receive an input for the predetermined position.

According to the present disclosure, for example, a touchscreen can be used as the input circuit so as to input the predetermined position.

The present disclosure provides a parking assistance apparatus mountable on a vehicle that includes: at least one steered wheel, at least one driven wheel, a power unit configured to provide a driving force to the driven wheel, and an operation device configured to receive at least an operation of changing power of the power unit, in which a path to a predetermined position is generated, and at least a vehicle wheel angle of the steered wheel is changed based on the path to assist parking of the vehicle at the predetermined position, and in which before the predetermined position on the path, the vehicle wheel angle of the steered wheel is changed based on the path, and in which if the vehicle travels beyond the predetermined position of the path, the vehicle wheel angle of the steered wheel is changed to allow the vehicle to advance in a tangential direction of the predetermined position of the path.

According to the present disclosure, when the vehicle advances beyond the predetermined position of the path, since the vehicle wheel angle of the steered wheel is changed such that the vehicle advances in the tangential direction of the predetermined position, simply by the vehicle advancing (forward/backward) in the tangential direction, a new path can be generated via the predetermined position of the original path.

According to the parking assistance apparatus of the present disclosure having the above-described configuration, the steered wheel and the driven wheel of the vehicle are the same.

According to the present disclosure, even when the steered wheel and the driven wheel are the same, since the vehicle wheel angle of the steered wheel is changed such that the vehicle advances in the tangential direction of the predetermined position of the path, simply by advancing the vehicle in the tangential direction, a new path can be generated via the predetermined position of the original path.

According to the parking assistance apparatus of the present disclosure having the above-described configuration, at least one of the steered wheel and the driven wheel of the vehicle includes a braking mechanism, and the operation device is configured to receive operation that changes a braking force of the braking mechanism.

According to the present disclosure, the operation device can perform the operation of changing the braking force. For example, when the operation device is a brake pedal, the brake pedal is depressed so as to increase a braking force. When the operation device is, for example, an accelerator pedal, the driving force of the power unit can be changed.

According to the parking assistance apparatus of the present disclosure having the above-described configuration, the power unit of the vehicle includes at least one of an internal combustion engine and an electric motor.

According to the present disclosure, the vehicle can be advanced (forward/backward) by the internal combustion engine, the electric motor, or both the internal combustion engine and the electric motor.

According to the parking assistance apparatus of the present disclosure having the above-described configuration, the vehicle includes an electric power steering configured to change the vehicle wheel angle of the steered wheel.

According to the present disclosure, the vehicle wheel angle of the steered wheel can be changed by electric power.

According to the parking assistance apparatus of the present disclosure having the above-described configuration, the at least one steered wheel of the vehicle includes two vehicle wheels and the at least one driven wheel of the vehicle includes two vehicle wheels.

According to the present disclosure, the vehicle can be advanced with at least four vehicle wheels.

The parking assistance apparatus of the present disclosure having the above-described configuration includes a processor and the processor is configured to generate the path.

According to the present disclosure, the processor can generate the path.

According to the parking assistance apparatus of the present disclosure having the above-described configuration, the processor is configured to generate a next path after the vehicle is stopped.

According to the present disclosure, the vehicle is stopped, so that the next path can be generated. When a stop position is, for example, in the vicinity of an end point of the path, the next path is generated after the vehicle reaches and is stopped in the vicinity of the end point.

According to the parking assistance apparatus of the present disclosure having the above-described configuration, the vehicle further includes a camera configured to capture an image of an outside and a display circuit configured to display a second image corresponding to a first image captured by the camera, in which the display circuit is configured to overlap and display the predetermined position on the second image.

According to the present disclosure, for example, it is possible to overlap and display the predetermined position on the second image corresponding to the first image captured by an all-around camera.

According to the parking assistance apparatus of the present disclosure having the above-described configuration, the vehicle includes an input circuit, and the input circuit is configured to receive an input for the predetermined position.

According to the present disclosure, for example, a touchscreen can be used as the input circuit so as to input the predetermined position.

The present disclosure provides a vehicle configured to assist parking at a predetermined position by generating a path to the predetermined position and changing, based on the path, at least a vehicle wheel angle of a steered wheel, the vehicle including: at least one steered wheel; at least one driven wheel; a power unit configured to provide a driving force to the driven wheel; and an operation device configured to receive at least an operation of changing power of the power unit, in which before the predetermined position on the path, the vehicle wheel angle of the steered wheel is changed based on the path, and if the vehicle travels beyond the predetermined position of the path, the vehicle travels with the vehicle wheel angle of the steered wheel being set to a vehicle wheel angle within a predetermined range with reference to vehicle wheel angle at the predetermined position.

According to the present disclosure, when the vehicle advances beyond the predetermined position of the path, since the vehicle advances with the vehicle wheel angle of the steered wheel being set to the vehicle wheel angle within a predetermined range with reference to the vehicle wheel angle at the predetermined position, a new path can be generated via the predetermined position of the original path.

In the vehicle of the present disclosure having the above-described configuration, the steered wheel and the driven wheel are the same.

According to the present disclosure, even when the steered wheel and the driven wheel are the same, since the vehicle advances with the vehicle wheel angle of the steered wheel being set to the vehicle wheel angle within a predetermined range with reference to the vehicle wheel angle at the predetermined position, a new path can be generated via the predetermined position of the original path.

In the vehicle of the present disclosure having the above-described configuration, at least one of the steered wheel and the driven wheel includes a braking mechanism, and the operation device is configured to receive an operation of changing a braking force of the braking mechanism.

According to the present disclosure, the operation device can perform the operation of changing the braking force. For example, when the operation device is a brake pedal, the brake pedal is depressed so as to increase a braking force. When the operation device is, for example, an accelerator pedal, the driving force of the power unit can be changed.

In the vehicle of the present disclosure having the above-described configuration, the power unit includes at least one of an internal combustion engine and an electric motor.

According to the present disclosure, the vehicle can be advanced (forward/backward) by the internal combustion engine, the electric motor, or both the internal combustion engine and the electric motor.

The vehicle of the present disclosure having the above-described configuration includes an electric power steering configured to change the vehicle wheel angle of the steered wheel.

According to the present disclosure, the vehicle wheel angle of the steered wheel can be changed by electric power.

In the vehicle of the present disclosure having the above-described configuration, the at least one steered wheel includes two vehicle wheels and the at least one driven wheel includes two vehicle wheels.

According to the present disclosure, the vehicle can be advanced with at least four vehicle wheels.

The vehicle of the present disclosure having the above-described configuration includes a processor and the processor is configured to generate the path.

According to the present disclosure, the processor can generate the path.

In the vehicle of the present disclosure having the above-described configuration, the processor is configured to generate a next path after the vehicle is stopped.

According to the present disclosure, the vehicle is stopped, so that the next path can be generated. When a stop position is, for example, in the vicinity of an end point of the path, the next path is generated after the vehicle reaches and is stopped in the vicinity of the end point.

The vehicle of the present disclosure having the above-described configuration further includes a camera configured to capture an image of an outside and a display circuit configured to display a second image corresponding to a first image captured by the camera, in which the display circuit is configured to overlap and display the predetermined position on the second image.

According to the present disclosure, for example, it is possible to overlap and display the predetermined position on the second image corresponding to the first image captured by an all-around camera.

The vehicle of the present disclosure having the above-described configuration includes an input circuit, and the input circuit is configured to receive an input for the predetermined position.

According to the present disclosure, for example, a touch-screen can be used as the input circuit so as to input the predetermined position.

The present disclosure provides a parking assistance apparatus mountable on a vehicle that includes: at least one steered wheel, at least one driven wheel, a power unit configured to provide a driving force to the driven wheel, and an operation device configured to receive at least an operation of changing power of the power unit, in which a path to a predetermined position is generated, and at least a vehicle wheel angle of the steered wheel is changed based on the path to assist the vehicle at the predetermined position, in which before the predetermined position on the path, the vehicle wheel angle of the steered wheel is changed based on the path, and in which if the vehicle travels beyond the predetermined position of the path, the vehicle travels with the vehicle wheel angle of the steered wheel being set to a vehicle wheel angle within a predetermined range with reference to a vehicle wheel angle at the predetermined position.

According to the present disclosure, when the vehicle advances beyond the predetermined position of the path, since the vehicle advances with the vehicle wheel angle of the steered wheel being set to the vehicle wheel angle within a predetermined range with reference to the vehicle wheel angle at the predetermined position, a new path can be generated via the predetermined position of the original path.

According to the parking assistance apparatus of the present disclosure having the above-described configuration, the steered wheel and the driven wheel of the vehicle are the same.

According to the present disclosure, even when the steered wheel and the driven wheel are the same, since the vehicle advances with the vehicle wheel angle of the steered wheel being set to the vehicle wheel angle within a predetermined range with reference to the vehicle wheel angle at the predetermined position, a new path can be generated via the predetermined position of the original path.

According to the parking assistance apparatus of the present disclosure having the above-described configuration, at least one of the steered wheel and the driven wheel of the vehicle includes a braking mechanism, and the operation device is configured to receive an operation of changing a braking force of the braking mechanism.

According to the present disclosure, the operation device can perform the operation of changing the braking force. For example, when the operation device is a brake pedal, the brake pedal is depressed so as to increase a braking force. When the operation device is, for example, an accelerator pedal, the driving force of the power unit can be changed.

According to the parking assistance apparatus of the present disclosure having the above-described configuration, the power unit of the vehicle includes at least one of an internal combustion engine and an electric motor.

According to the present disclosure, the vehicle can be advanced (forward/backward) by the internal combustion engine, the electric motor, or both the internal combustion engine and the electric motor.

According to the parking assistance apparatus of the present disclosure having the above-described configuration, the vehicle includes an electric power steering configured to change the vehicle wheel angle of the steered wheel.

According to the present disclosure, the vehicle wheel angle of the steered wheel can be changed by electric power.

According to the parking assistance apparatus of the present disclosure having the above-described configuration, the at least one steered wheel of the vehicle includes two vehicle wheels and the at least one driven wheel of the vehicle includes two vehicle wheels.

According to the present disclosure, the vehicle can be advanced with at least four vehicle wheels.

The parking assistance apparatus of the present disclosure having the above-described configuration includes a processor and the processor is configured to generate the path.

According to the present disclosure, the processor can generate the path.

According to the parking assistance apparatus of the present disclosure having the above-described configuration, the processor is configured to generate a next path after the vehicle is stopped.

According to the present disclosure, the vehicle is stopped, so that the next path can be generated. When a stop position is, for example, in the vicinity of an end point of the path, the next path is generated after the vehicle reaches and is stopped in the vicinity of the end point.

According to the parking assistance apparatus of the present disclosure having the above-described configuration, the vehicle further includes a camera configured to capture an image of an outside and a display circuit configured to display a second image corresponding to a first image captured by the camera, in which the display circuit is configured to overlap and display the predetermined position on the second image.

According to the present disclosure, for example, it is possible to overlap and display the predetermined position on the second image corresponding to the first image captured by an all-around camera.

According to the parking assistance apparatus of the present disclosure having the above-described configuration, the vehicle includes an input circuit, and the input circuit is configured to receive an input for the predetermined position.

According to the present disclosure, for example, a touchscreen can be used as the input circuit so as to input the predetermined position.

The present disclosure provides a vehicle configured to assist parking at a predetermined position by a processor generating, at a first position, a path to a second position and changing, based on the path, at least a vehicle wheel angle of a steered wheel, the vehicle including: at least one steered wheel; at least one driven wheel; a power unit configured to provide a driving force to the driven wheel; an operation device configured to receive at least an operation of changing power of the power unit; and the processor, in which at least when the processor is generating the path at the first position, the vehicle travels with the vehicle wheel angle of the steered wheel being set to a vehicle wheel angle within a predetermined range with reference to a vehicle wheel angle at the first position.

According to the present disclosure, when the processor is generating, at the first position, the path to the second position that is a target position, the vehicle advances with the vehicle wheel angle of the steered wheel being set to the vehicle wheel angle within a predetermined range with reference to the vehicle wheel angle at the first position. Therefore, even when the vehicle moves while the path is generated, guidance can be continued to the final target position.

In the vehicle of the present disclosure having the above-described configuration, when the processor is generating the path, the vehicle travels with the vehicle wheel angle of the steered wheel being set to the vehicle wheel angle within a predetermined range with reference to the vehicle wheel angle at the predetermined position.

According to the present disclosure, when the processor is generating, at the first position, the path to the second position that is the target position, the vehicle advances with the vehicle wheel angle of the steered wheel being set to the vehicle wheel angle within a predetermined range with reference to the vehicle wheel angle at the predetermined position. Therefore, even when the vehicle moves while the path is generated, guidance can be continued to the final target position.

In the vehicle of the present disclosure having the above-described configuration, the processor is configured to generate a next path after the vehicle is stopped.

According to the present disclosure, the vehicle is stopped, so that the next path can be generated.

In the vehicle of the present disclosure having the above-described configuration, the steered wheel and the driven wheel are the same.

According to the present disclosure, even when the steered wheel and the driven wheel are the same, the vehicle advances with the vehicle wheel angle of the steered wheel being set to the vehicle wheel angle within a predetermined range with reference to the vehicle wheel angle at the first position or the vehicle wheel angle at the predetermined position. Therefore, even when the vehicle moves while the next path is generated, guidance can be continued to the final target position.

In the vehicle of the present disclosure having the above-described configuration, at least one of the steered wheel and the driven wheel includes a braking mechanism, and the operation device is configured to receive an operation of changing a braking force of the braking mechanism.

According to the present disclosure, the operation device can perform the operation of changing the braking force. For example, when the operation device is a brake pedal, the brake pedal is depressed so as to increase a braking force. When the operation device is, for example, an accelerator pedal, the driving force of the power unit can be changed.

In the vehicle of the present disclosure having the above-described configuration, the power unit includes at least one of an internal combustion engine and an electric motor.

According to the present disclosure, the vehicle can be advanced (forward/backward) by the internal combustion engine, the electric motor, or both the internal combustion engine and the electric motor.

The vehicle of the present disclosure having the above-described configuration includes an electric power steering configured to change the vehicle wheel angle of the steered wheel.

According to the present disclosure, the vehicle wheel angle of the steered wheel can be changed by electric power.

In the vehicle of the present disclosure having the above-described configuration, the at least one steered wheel includes two vehicle wheels and the at least one driven wheel includes two vehicle wheels.

According to the present disclosure, the vehicle can be advanced with at least four vehicle wheels.

The vehicle of the present disclosure having the above-described configuration further includes a camera configured to capture an image of an outside and a display circuit configured to display a second image corresponding to a first image captured by the camera, in which the display circuit is configured to overlap and display the predetermined position on the second image.

According to the present disclosure, for example, it is possible to overlap and display the predetermined position on the second image corresponding to the first image captured by an all-around camera.

The vehicle of the present disclosure having the above-described configuration includes an input circuit, and the input circuit is configured to receive an input for the predetermined position.

According to the present disclosure, for example, a touch-screen can be used as the input circuit so as to input the predetermined position.

The present disclosure provides a parking assistance apparatus mountable on a vehicle and configured to assist parking at a predetermined position by a processor generating, at a first position, a path to a second position and changing, based on the path, at least a vehicle wheel angle of a steered wheel, the vehicle including at least one steered wheel, at least one driven wheel, a power unit configured to provide a driving force to the driven wheel, an operation device configured to receive at least an operation of changing power of the power unit, and the processor, in which at least when the processor is generating the path at the first position, the vehicle wheel angle of the steered wheel are set to a vehicle wheel angle within a predetermined range with reference to a vehicle wheel angle at the first position.

According to the present disclosure, when the processor is generating, at the first position, the path to the second position that is a target position, the vehicle advances with the vehicle wheel angle of the steered wheel being set to the vehicle wheel angle within a predetermined range with reference to the vehicle wheel angle at the first position. Therefore, even when the vehicle moves while the path is generated, guidance can be continued to the final target position.

According to the parking assistance apparatus of the present disclosure having the above-described configuration, when the processor is generating the path, the vehicle travels with the vehicle wheel angle of the steered wheel being set to the vehicle wheel angle within a predetermined range with reference to the vehicle wheel angle at the predetermined position.

According to the present disclosure, when the processor is generating, at the first position, the path to the second position that is the target position, the vehicle advances with the vehicle wheel angle of the steered wheel being set to the vehicle wheel angle within a predetermined range with reference to the vehicle wheel angle at the predetermined position. Therefore, even when the vehicle moves while the path is generated, guidance can be continued to the final target position.

According to the parking assistance apparatus of the present disclosure having the above-described configuration, the processor is configured to generate a next path after the vehicle is stopped.

According to the present disclosure, the vehicle is stopped, so that the next path can be generated.

According to the parking assistance apparatus of the present disclosure having the above-described configuration, the steered wheel and the driven wheel of the vehicle are the same.

According to the present disclosure, even when the steered wheel and the driven wheel are the same, the vehicle advances with the vehicle wheel angle of the steered wheel being set to the vehicle wheel angle within a predetermined range with reference to the vehicle wheel angle at the first position or the vehicle wheel angle at the predetermined position. Therefore, even when the vehicle moves while the next path is generated, guidance can be continued to the final target position.

According to the parking assistance apparatus of the present disclosure having the above-described configuration, at least one of the steered wheel and the driven wheel includes a braking mechanism, and the operation device is configured to receive operation that changes a braking force of the braking mechanism.

According to the present disclosure, the operation device can perform the operation of changing the braking force. For example, when the operation device is a brake pedal, the brake pedal is depressed so as to increase a braking force. When the operation device is, for example, an accelerator pedal, the driving force of the power unit can be changed.

According to the parking assistance apparatus of the present disclosure having the above-described configuration, the power unit of the vehicle includes at least one of an internal combustion engine and an electric motor.

According to the present disclosure, the vehicle can be advanced (forward/backward) by the internal combustion engine, the electric motor, or both the internal combustion engine and the electric motor.

According to the parking assistance apparatus of the present disclosure having the above-described configuration, the vehicle includes an electric power steering configured to change the vehicle wheel angle of the steered wheel.

According to the present disclosure, the vehicle wheel angle of the steered wheel can be changed by electric power.

According to the parking assistance apparatus of the present disclosure having the above-described configuration, the at least one steered wheel of the vehicle includes two vehicle wheels and the at least one driven wheel of the vehicle includes two vehicle wheels.

According to the present disclosure, the vehicle can be advanced with at least four vehicle wheels.

According to the parking assistance apparatus of the present disclosure having the above-described configuration, the vehicle further includes a camera configured to capture an image of an outside and a display circuit configured to display a second image corresponding to a first image captured by the camera, in which the display circuit is configured to overlap and display the predetermined position on the second image.

According to the present disclosure, for example, it is possible to overlap and display the predetermined position on the second image corresponding to the first image captured by an all-around camera.

According to the parking assistance apparatus of the present disclosure having the above-described configuration, the vehicle further includes an input circuit, and the input circuit is configured to receive an input for the predetermined position.

According to the present disclosure, for example, a touch-screen can be used as the input circuit so as to input the predetermined position.

The present disclosure provides a vehicle configured to assist parking at a predetermined position by generating a path having an advancing direction and changing, based on the path, at least a vehicle wheel angle of a steered wheel, the vehicle including: at least one steered wheel; at least one driven wheel; a power unit configured to provide a driving force to the driven wheel; an operation device configured to receive at least an instruction related to a forward advancing direction or a backward advancing direction, in which if the advancing direction of the path coincides with the advancing direction received by the operation device, at least the vehicle wheel angle of the steered wheel is changed based on the path, and is the advancing direction of the path does not coincide with the advancing direction received by the operation device, the vehicle wheel angle of the steered wheel is set to a value within a predetermined range.

According to the present disclosure, when the advancing direction of the generated path coincides with the advancing direction received by the operation device, the vehicle wheel angle of the steered wheel is changed based on the generated path and when the advancing direction of the generated path does not coincide with the advancing direction received by the operation device, the vehicle wheel angle of the steered wheel is set to the value within a predetermined range. Therefore, even when the vehicle moves after the path is generated, guidance can be continued to a final target position.

In the vehicle of the present disclosure having the above-described configuration, the operation device is configured to receive at least an operation of changing power of the power unit.

According to the present disclosure, the power of the power unit can be changed.

In the vehicle of the present disclosure having the above-described configuration, the steered wheel and the driven wheel are the same.

According to the present disclosure, even when the steered wheel and the driven wheel are the same, when the advancing direction of the generated path does not coincide with the advancing direction received by the operation device, the vehicle wheel angle of the steered wheel is set to the value within a predetermined range. Therefore, even when the vehicle moves after the path is generated, guidance can be continued to the final target position.

In the vehicle of the present disclosure having the above-described configuration, at least one of the steered wheel and the driven wheel includes a braking mechanism, and the operation device is configured to receive an operation of changing a braking force of the braking mechanism.

According to the present disclosure, the operation device can perform the operation of changing the braking force. For example, when the operation device is a brake pedal, the brake pedal is depressed so as to increase a braking force.

In the vehicle of the present disclosure having the above-described configuration, the power unit includes at least one of an internal combustion engine and an electric motor.

According to the present disclosure, the vehicle can be advanced (forward/backward) by the internal combustion engine, the electric motor, or both the internal combustion engine and the electric motor.

The vehicle of the present disclosure having the above-described configuration includes an electric power steering configured to change the vehicle wheel angle of the steered wheel.

According to the present disclosure, the vehicle wheel angle of the steered wheel can be changed by electric power.

In the vehicle of the present disclosure having the above-described configuration, the at least one steered wheel includes two vehicle wheels and the at least one driven wheel includes two vehicle wheels.

According to the present disclosure, the vehicle can be advanced with at least four vehicle wheels.

The vehicle of the present disclosure having the above-described configuration includes a processor, the processor generates the path, and the value of the vehicle wheel angle within the predetermined range is a value based on the vehicle wheel angle of the steered wheel while the processor generates the path.

According to the present disclosure, the vehicle wheel angle can be set to appropriate values.

The vehicle of the present disclosure having the above-described configuration further includes a camera configured to capture an image of an outside and a display circuit configured to display a second image corresponding to a first image captured by the camera, in which the display circuit is configured to overlap and display the predetermined position on the second image.

According to the present disclosure, for example, it is possible to overlap and display the predetermined position on the second image corresponding to the first image captured by an all-around camera.

The vehicle of the present disclosure having the above-described configuration includes an input circuit, and the input circuit is configured to receive an input for the predetermined position.

According to the present disclosure, for example, a touch-screen can be used as the input circuit so as to input the predetermined position.

The present disclosure provides a parking assistance apparatus mountable on a vehicle that includes at least one steered wheel, at least one driven wheel, a power unit configured to provide a driving force to the driven wheel, and an operation device configured to receive at least an instruction related to a forward advancing direction or a backward advancing direction, in which a path having an advancing direction is generated and at least a vehicle wheel angle of the steered wheel is changed based on the path to assist parking at a predetermined position, and if the advancing direction of the path coincides with the advancing direction received by the operation device, at least the vehicle wheel angle of the steered wheel is changed based on the path, and if the advancing direction of the path does not coincide with the advancing direction received by the operation device, the vehicle wheel angle of the steered wheel is set to a value within a predetermined range.

According to the present disclosure, when the advancing direction of the generated path coincides with the advancing direction received by the operation device, the vehicle wheel angle of the steered wheel is changed based on the generated path and when the advancing direction of the generated path does not coincide with the advancing direction received by the operation device, the vehicle wheel angle of the steered wheel is set to the value within a predetermined range. Therefore, even when the vehicle moves after the path is generated, guidance can be continued to a final target position.

According to the parking assistance apparatus of the present disclosure having the above-described configuration, the operation device is configured to receive at least an operation of changing power of the power unit.

According to the present disclosure, the power of the power unit can be changed.

According to the parking assistance apparatus of the present disclosure having the above-described configuration, the steered wheel and the driven wheel of the vehicle are the same.

According to the present disclosure, even when the steered wheel and the driven wheel are the same, when the advancing direction of the generated path does not coincide with the advancing direction received by the operation device, the vehicle wheel angle of the steered wheel is set to the value within a predetermined range. Therefore, even when the vehicle moves after the path is generated, guidance can be continued to the final target position.

According to the parking assistance apparatus of the present disclosure having the above-described configuration, at least one of the steered wheel and the driven wheel of the vehicle includes a braking mechanism, and the operation device is configured to receive an operation of changing a braking force of the braking mechanism.

According to the present disclosure, the operation device can perform the operation of changing the braking force. For example, when the operation device is a brake pedal, the brake pedal is depressed so as to increase a braking force.

According to the parking assistance apparatus of the present disclosure having the above-described configuration, the power unit of the vehicle includes at least one of an internal combustion engine and an electric motor.

According to the present disclosure, the vehicle can be advanced (forward/backward) by the internal combustion engine, the electric motor, or both the internal combustion engine and the electric motor.

According to the parking assistance apparatus of the present disclosure having the above-described configuration, the vehicle includes an electric power steering configured to change the vehicle wheel angle of the steered wheel.

According to the present disclosure, the vehicle wheel angle of the steered wheel can be changed by electric power.

According to the parking assistance apparatus of the present disclosure having the above-described configuration, the at least one steered wheel of the vehicle includes two vehicle wheels and the at least one driven wheel of the vehicle includes two vehicle wheels.

According to the present disclosure, the vehicle can be advanced with at least four vehicle wheels.

The parking assistance apparatus of the present disclosure having the above-described configuration includes a processor, the processor generates the path, and the value of the vehicle wheel angle within the predetermined range is a value based on the vehicle wheel angle of the steered wheel while the processor generates the path.

According to the present disclosure, the vehicle wheel angle can be set to appropriate values.

According to the parking assistance apparatus of the present disclosure having the above-described configuration, the vehicle further includes a camera configured to capture an image of an outside and a display circuit configured to display a second image corresponding to a first image captured by the camera, in which the display circuit is configured to overlap and display the predetermined position on the second image.

According to the present disclosure, for example, it is possible to overlap and display the predetermined position on the second image corresponding to the first image captured by an all-around camera.

According to the parking assistance apparatus of the present disclosure having the above-described configuration, the vehicle includes an input circuit, and the input circuit is configured to receive an input for the predetermined position.

According to the present disclosure, for example, a touch-screen can be used as the input circuit so as to input the predetermined position.

The present disclosure provides a vehicle configured to assist parking at a predetermined position by generating a path to the predetermined position and changing, based on the path, at least a vehicle wheel angle of a steered wheel, the vehicle including: at least one steered wheel; at least one driven wheel; and a power unit configured to provide a driving force to the driven wheel, in which the path includes at least a forward path on which the vehicle travels forward to a stop position and a backward path on which the vehicle travels backward from the stop position, and in which on the forward path, if the vehicle is positioned at a point where a distance from the stop position is larger than a first distance, the vehicle wheel angle is set to a value larger than a first angle that is a positive value with respect to a straight-traveling direction, and if the vehicle is positioned at a point where the distance from the stop position is smaller than the first distance, the vehicle wheel angle is set to the first angle with respect to the straight-traveling direction, and in which at the stop position, the vehicle wheel angle is changed, with respect to the straight-traveling direction, from the first angle to a second angle that is a negative value, and in which on the backward path, if the vehicle is positioned at a point where the distance from the stop position is smaller than a second distance, the vehicle wheel angle is set to the second angle with respect to the straight-traveling direction, and if the vehicle is positioned at a point where the distance from the stop position is larger than the second distance, the vehicle wheel angle is set to a value smaller than the second angle with respect to the straight-traveling direction.

According to the present disclosure, since the vehicle wheel angle at which stationary steering is allowed when an end point of the path is reached can be controlled to be small, a load on an electric power steering can be reduced.

In the vehicle of the present disclosure having the above-described configuration, the first distance and the second distance substantially coincide with each other.

According to the present disclosure, on each of the forward path and the backward path, the vehicle wheel angle at which the stationary steering is allowed at the same level can be controlled to be small.

In the vehicle of the present disclosure having the above-described configuration, an absolute value of the first angle and an absolute value of the second angle substantially coincide with each other.

According to the present disclosure, on each of the forward path and the backward path, the vehicle wheel angle at which the stationary steering is allowed can be made substantially the same.

In the vehicle of the present disclosure having the above-described configuration, when the vehicle wheel angle is a positive value with respect to the straight-traveling direction, the vehicle turns to left and when the vehicle wheel angle is a negative value, the vehicle turns to right, or when the vehicle wheel angle is a positive value with respect to the straight-traveling direction, the vehicle turns to right and when the vehicle wheel angle is a negative value, the vehicle turns to left.

According to the present disclosure, when the vehicle wheel angle is a positive value with respect to the straight-traveling direction, the vehicle can turn to left (or right), and when the vehicle wheel angle is a negative value, the vehicle can turn to right (or left).

The vehicle of the present disclosure having the above-described configuration includes an electric power steering configured to change the vehicle wheel angle of the steered wheel.

According to the present disclosure, the vehicle wheel angle of the steered wheel can be changed by electric power.

In the vehicle of the present disclosure having the above-described configuration, the steered wheel and the driven wheel are the same.

According to the present disclosure, even when the steered wheel and the driven wheel are the same, since the vehicle wheel angle at which the stationary steering is allowed when the end point of the path is reached can be controlled to be small, the load on the electric power steering can be reduced.

In the vehicle of the present disclosure having the above-described configuration, the power unit includes at least one of an internal combustion engine and an electric motor.

According to the present disclosure, the vehicle can be advanced (forward/backward) by the internal combustion engine, the electric motor, or both the internal combustion engine and the electric motor.

In the vehicle of the present disclosure having the above-described configuration, the at least one steered wheel includes two vehicle wheels and the at least one driven wheel includes two vehicle wheels.

According to the present disclosure, the vehicle can be advanced with at least four vehicle wheels.

The vehicle of the present disclosure having the above-described configuration includes a processor and the processor is configured to generate the path.

According to the present disclosure, the processor can generate the path.

The vehicle of the present disclosure having the above-described configuration includes an input circuit, and the input circuit is configured to receive an input for the predetermined position.

According to the present disclosure, for example, a touch-screen can be used as the input circuit so as to input the predetermined position.

The present disclosure provides a parking assistance apparatus mountable on a vehicle that includes at least one steered wheel, at least one driven wheel, and a power unit configured to provide a driving force to the driven wheel, in which a path to a predetermined position is generated and at least a vehicle wheel angle of the steered wheel is changed based on the path, so that parking at the predetermined position is assisted, and in which the path includes at least a forward path on which the vehicle travels forward to a stop position and a backward path on which the vehicle travels backward from the stop position, and in which on the forward path, if the vehicle is positioned at a distance from the stop position is larger than a first distance, the vehicle wheel angle is set to a value larger than a first angle that is a positive value with respect to a straight-traveling direction, and if the vehicle is positioned at a point where the distance from the stop position is smaller than the first distance, the vehicle wheel angle is set to the first angle with respect to the straight-traveling direction, and in which at the stop position, the vehicle wheel angle is changed, with respect to the straight-traveling direction, from the first angle to a second angle that is a negative value, and in which on the backward path, if the vehicle is positioned at a point where the distance from the stop position is smaller than a second distance, the vehicle wheel angle is set to the second angle with respect to the straight-traveling direction, and if the vehicle is positioned at a point where the distance from the stop position is larger than the second distance, the vehicle wheel angle is set to a value smaller than the second angle with respect to the straight-traveling direction.

According to the present disclosure, since the vehicle wheel angle at which stationary steering is allowed when an end point of the path is reached can be controlled to be small, a load on an electric power steering can be reduced.

According to the parking assistance apparatus of the present disclosure having the above-described configuration, the first distance and the second distance substantially coincide with each other.

According to the present disclosure, on each of the forward path and the backward path, the vehicle wheel angle at which the stationary steering is allowed at the same level can be controlled to be small.

According to the parking assistance apparatus of the present disclosure having the above-described configuration, an absolute value of the first angle and an absolute value of the second angle substantially coincide with each other.

According to the present disclosure, on each of the forward path and the backward path, the vehicle wheel angle at which the stationary steering is allowed can be made substantially the same.

According to the parking assistance apparatus of the present disclosure having the above-described configuration, when the vehicle wheel angle is a positive value with respect to the straight-traveling direction, the vehicle turns to left and when the vehicle wheel angle is a negative value, the vehicle turns to right, or when the vehicle wheel angle is a positive value with respect to the straight-traveling direction, the vehicle turns to right and when the vehicle wheel angle is a negative value, the vehicle turns to left.

According to the present disclosure, when the vehicle wheel angle is a positive value with respect to the straight-traveling direction, the vehicle can turn to left (or right), and when the vehicle wheel angle is a negative value, the vehicle can turn to right (or left).

According to the parking assistance apparatus of the present disclosure having the above-described configuration, the vehicle includes an electric power steering configured to change the vehicle wheel angle of the steered wheel.

According to the present disclosure, the vehicle wheel angle of the steered wheel can be changed by electric power.

According to the parking assistance apparatus of the present disclosure having the above-described configuration, the steered wheel and the driven wheel of the vehicle are the same.

According to the present disclosure, even when the steered wheel and the driven wheel are the same, since the vehicle wheel angle at which the stationary steering is allowed when the end point of the path is reached can be controlled to be small, the load on the electric power steering can be reduced.

According to the parking assistance apparatus of the present disclosure having the above-described configuration, the power unit of the vehicle includes at least one of an internal combustion engine and an electric motor.

According to the present disclosure, the vehicle can be advanced (forward/backward) by the internal combustion engine, the electric motor, or both the internal combustion engine and the electric motor.

According to the parking assistance apparatus of the present disclosure having the above-described configuration, the at least one steered wheel of the vehicle includes two vehicle wheels and the at least one driven wheel of the vehicle includes two vehicle wheels.

According to the present disclosure, the vehicle can be advanced with at least four vehicle wheels.

The parking assistance apparatus of the present disclosure having the above-described configuration includes a processor and the processor is configured to generate the path.

According to the present disclosure, the processor can generate the path.

According to the parking assistance apparatus of the present disclosure having the above-described configuration, the vehicle includes an input circuit, and the input circuit is configured to receive an input for the predetermined position.

According to the present disclosure, for example, a touchscreen can be used as the input circuit so as to input the predetermined position.

INDUSTRIAL APPLICABILITY

The vehicle and the parking assistance apparatus of the present disclosure are useful for a vehicle such as an automobile.

Although various embodiments have been described above, it should be recognized that various changes in a shape and details may be made without departing from spirit and scope of the invention claimed now or in the future.

The present application claims the benefit of priority to Japanese Patent Application No. 2019-120332 filed on Jun. 27, 2019, Japanese Patent Application No. 2019-120333 filed on Jun. 27, 2019, Japanese Patent Application No. 2019-120334 filed on Jun. 27, 2019, Japanese Patent Application No. 2019-120335 filed on Jun. 27, 2019, and Japanese Patent Application No. 2019-120336 filed on Jun. 27, 2019, the contents of which are incorporated herein by reference.

The invention claimed is:

1. A vehicle configured to assist parking from a predetermined position by generating a path to the predetermined position and changing, based on the path, at least a vehicle wheel angle of a steered wheel, the vehicle comprising:
   at least one steered wheel;
   at least one driven wheel;
   a power unit configured to provide a driving force to the driven wheel; and
   an operation device configured to receive at least an operation of changing power of the power unit,
   wherein, when the vehicle is to assist parking by turning toward a target parking position from the predetermined position, the vehicle wheel angle of the steered wheel is changed, before the predetermined position on the path, based on the path, and
   wherein, if the vehicle travels in a forward direction beyond the predetermined position of the path and away from the target parking position, the vehicle wheel angle of the steered wheel is changed to allow the vehicle to advance in the forward direction beyond the predetermined position in a tangential direction of the path, with a point of tangency of the tangential direction being the predetermined position.

2. The vehicle according to claim 1, wherein the steered wheel and the driven wheel are the same.

3. The vehicle according to claim 1, wherein at least one of the steered wheel and the driven wheel comprises a braking mechanism, and wherein the operation device is configured to receive an operation of changing a braking force of the braking mechanism.

4. The vehicle according to claim 1, wherein the power unit comprises at least one of an internal combustion engine and an electric motor.

5. The vehicle according to claim 1, further comprising: an electric power steering configured to change the vehicle wheel angle of the steered wheel.

6. The vehicle according to claim 1, wherein the at least one steered wheel comprises two vehicle wheels, and wherein the at least one driven wheel includes two vehicle wheels.

7. The vehicle according to claim 1, further comprising:
a processor,
wherein the processor is configured to generate the path.

8. The vehicle according to claim 7,
wherein the processor is configured to generate a next path after the vehicle is stopped.

9. The vehicle according to claim 1, further comprising:
a camera configured to capture an image of an outside of the vehicle; and
a display circuit configured to display a second image corresponding to a first image captured by the camera,
wherein the display circuit is configured to overlap and display the predetermined position on the second image.

10. The vehicle according to claim 1, further comprising:
an input circuit,
wherein the input circuit is configured to receive an input for the predetermined position.

11. A parking assistance apparatus mountable on a vehicle, the vehicle comprising:
   at least one steered wheel,
   at least one driven wheel,
   a power unit configured to provide a driving force to the driven wheel, and
   an operation device configured to receive at least an operation of changing power of the power unit,
   wherein the parking assistance apparatus comprises a processor,
   wherein the processor generates a path to a predetermined position and changes at least a vehicle wheel angle of the steered wheel is changed based on the path, to assist parking of the vehicle at the predetermined position,
   wherein, when the vehicle is to assist parking by turning toward a target parking position from the predetermined position, the processor changes the vehicle wheel angle of the steered wheel, before the predetermined position on the path, based on the path, and
   wherein, if the vehicle travels in a forward direction beyond the predetermined position of the path and away from the target parking position, the processor changes the vehicle wheel angle of the steered wheel to allow the vehicle to advance in the forward direction beyond the predetermined position in a tangential direction of the path, with a point of tangency of the tangential direction being the predetermined position.

12. The parking assistance apparatus according to claim 11,
wherein the steered wheel and the driven wheel of the vehicle are the same.

13. The parking assistance apparatus according to claim 11,
wherein at least one of the steered wheel and the driven wheel of the vehicle comprises a braking mechanism, and
wherein the operation device is configured to receive operation to change a braking force of the braking mechanism.

14. The parking assistance apparatus according to claim 11,
wherein the power unit of the vehicle comprises at least one of an internal combustion engine and an electric motor.

15. The parking assistance apparatus according to claim 11,
wherein the vehicle includes an electric power steering configured to change the vehicle wheel angle of the steered wheel.

16. The parking assistance apparatus according to claim 11,
wherein the at least one steered wheel of the vehicle comprises two vehicle wheels, and
wherein the at least one driven wheel of the vehicle includes two vehicle wheels.

17. The parking assistance apparatus according to claim 11,
wherein the processor is configured to generate a next path in the tangential direction from a position beyond the predetermined position in the forward direction to the predetermined position.

18. The parking assistance apparatus according to claim 17,
wherein the processor is configured to generate the next path after the vehicle is stopped.

19. The parking assistance apparatus according to claim 11,
wherein the vehicle further comprise:
a camera configured to capture an image of an outside of the vehicle; and
a display circuit configured to display a second image corresponding to a first image captured by the camera, and
wherein the display circuit is configured to overlap and display the predetermined position on the second image.

20. The parking assistance apparatus according to claim 11,
wherein the vehicle further comprises an input circuit, and
wherein the input circuit is configured to receive an input for the predetermined position.

\* \* \* \* \*